United States Patent [19]

Mohan

[11] Patent Number: 5,572,415
[45] Date of Patent: Nov. 5, 1996

[54] DC VOLTAGE SUPPLY CIRCUIT FOR RECTIFYING AN AC INPUT VOLTAGE TO PROVIDE A SUBSTANTIALLY CONSTANT DC OUTPUT VOLTAGE

[75] Inventor: Muni Mohan, Singapore, Singapore

[73] Assignee: SGS-Thomson Microelectronics Pte. Limited, Singapore, Singapore

[21] Appl. No.: 271,288

[22] Filed: Jul. 6, 1994

[30] Foreign Application Priority Data

Jul. 9, 1993 [GB] United Kingdom ............... 9314262

[51] Int. Cl.⁶ ......................................... H02M 7/19
[52] U.S. Cl. ............... 363/61; 363/85; 363/126; 363/143
[58] Field of Search ............... 363/61, 84, 85, 363/86, 89, 125, 126, 142, 143

[56] References Cited

U.S. PATENT DOCUMENTS

| | | | |
|---|---|---|---|
| 3,713,018 | 1/1973 | Tscheuschner | 363/143 |
| 4,268,899 | 5/1981 | Rokas | 363/61 |
| 4,608,500 | 8/1986 | Togawa | 363/61 |
| 4,665,323 | 5/1987 | Russell et al. | 307/75 |
| 4,780,805 | 10/1988 | Chewuk et al. | 363/142 |
| 4,845,607 | 7/1989 | Nakao et al. | 363/49 |
| 4,864,488 | 9/1989 | Bulmahn et al. | 363/143 |
| 4,933,832 | 6/1990 | Schneider et al. | 363/143 |
| 4,980,812 | 12/1990 | Johnson et al. | 363/89 |
| 5,119,283 | 6/1992 | Steigerwald et al. | 363/37 |
| 5,162,984 | 11/1992 | Castagnet et al. | 363/61 |
| 5,287,263 | 2/1994 | Shilo | 363/143 |

FOREIGN PATENT DOCUMENTS

| | | | |
|---|---|---|---|
| 1299560 | 6/1971 | United Kingdom | H02M 7/10 |
| 2157031 | 7/1984 | United Kingdom | G05F 5/00 |
| 2144931 | 3/1985 | United Kingdom | H02M 7/10 |

Primary Examiner—Jeffrey L. Sterrett
Attorney, Agent, or Firm—Vinson & Elkins L.L.P.

[57] ABSTRACT

A circuit is provided for rectifying an AC input voltage to provide a substantially constant DC output voltage. A composite input voltage is derived from the AC input voltage, which is composed of a scaled input AC voltage shifted by a selected DC bias voltage such that the entire range of such input signal voltages is contained within the supply voltages-of detection circuitry which controls the rectifier circuitry. The detection is thus carried out during both the upper and lower excursions of the input AC voltage.

10 Claims, 16 Drawing Sheets

FIG. 15
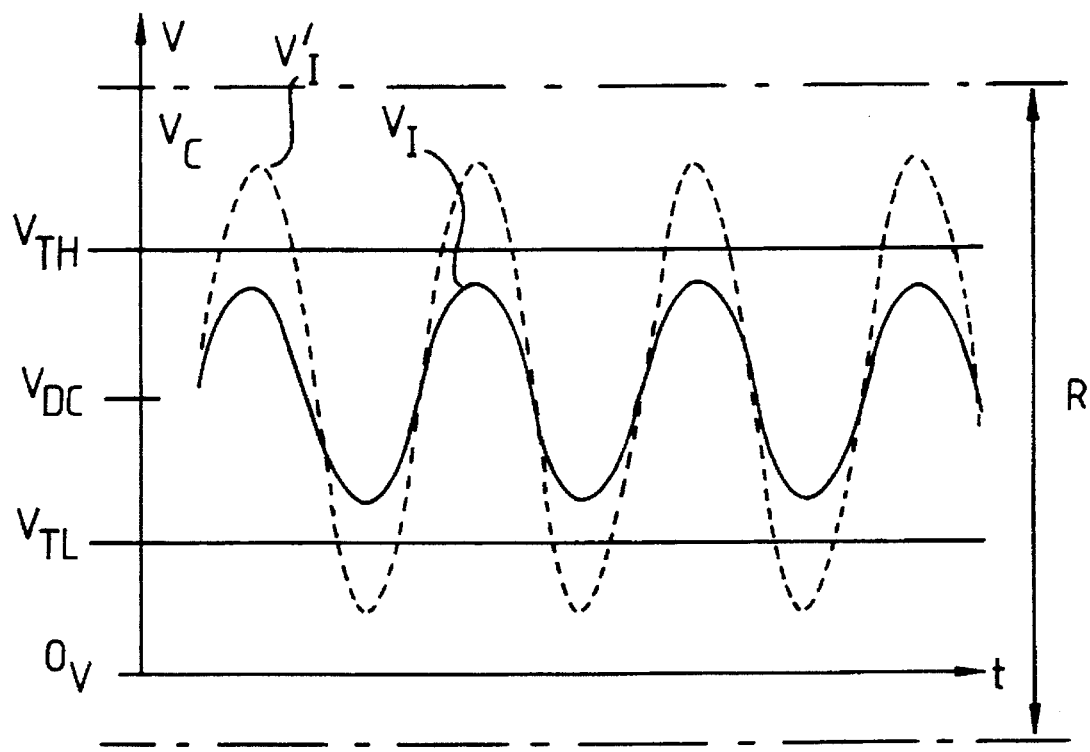
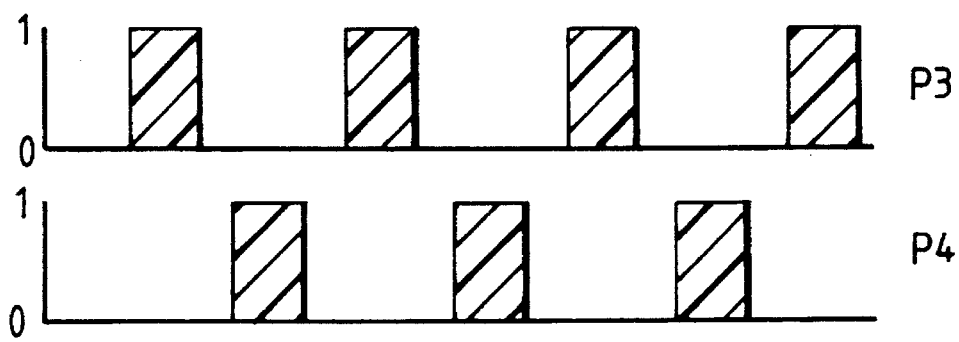

5,572,415

1

DC VOLTAGE SUPPLY CIRCUIT FOR RECTIFYING AN AC INPUT VOLTAGE TO PROVIDE A SUBSTANTIALLY CONSTANT DC OUTPUT VOLTAGE

FIELD OF THE INVENTION

The present invention relates to a DC supply circuit, particularly but not exclusively for use in mains powered equipment which detects the magnitude of the mains voltage applied and accordingly adjusts the operation of associated rectifier circuitry.

BACKGROUND OF THE INVENTION

There exists, throughout the world, a wide variety of mains AC voltages. Broadly, there are two groups: those of the low voltage range (88–132 Vrms) and those of the high voltage range (176–264 Vrms). It is desirable to design electrically powered equipment which can be used throughout the world, thereby to simplify design and production and to allow equipment to be portable between countries other than where originally purchased. This requires that the equipment must be adaptable for use on both voltage ranges.

The simplest way of achieving this has been to associate a manually operated doubler/bridge switch with the equipment. The operator will set the switch to the correct position before applying the mains voltage to the equipment.

FIGS. 1A and 1B illustrate a manually operated doubler/bridge switch. Four diodes $D_1$–$D_4$ are connected together as bridge rectifier. An AC input voltage $V_{LN}$ is applied between nodes 2, 4, where node 2 is connected to the anode of $D_1$ and the cathode of $D_2$, and node 4 is connected to the anode of $D_3$ and the cathode of $D_4$. Two capacitors $C_1$, $C_2$, preferably of equal value, are connected in series between nodes 6, 8, being the DC output nodes of the bridge rectifier. A load L is connected between nodes 6, 8 and is supplied with the DC output. A switch T is connected between node 4 and node 10, being the node between the two capacitors. When the manual switch T is open, as shown in FIG. 1A, diodes $D_1$–$D_4$ form a conventional bridge rectifier with capacitors $C_1$, $C_2$ to smooth the DC output generated. This is the bridge rectification mode. When the switch T is closed, as shown by FIG. 1B, diodes $D_1$, $D_2$ and capacitors $C_1$, $C_2$ operate as a combined voltage doubler and rectifier circuit of the known type. Diodes $D_3$, $D_4$ are superfluous in this mode. This is the voltage doubling rectification mode.

One major drawback of the manually operated doubler/bridge switch is that forgetting to check the position or choosing the wrong position of the switch would cause damage to the equipment, otherwise the equipment will have to be predesigned to prevent such damage, incurring extra cost.

An automatic doubler/bridge switch circuit is also known, which automatically doubles and rectifies a low range AC input voltage and which merely rectifies a high range AC input voltage. Sensing of the voltage level of the mains may be done by detecting peak voltage values of the AC waveform and using voltage comparators, or by sensing the magnitude of a DC rectified input voltage. Such circuits are available in either integrated circuit or discrete component form.

Such an integrated circuit automatic doubler/bridge switch is described in U.S. Pat. No. 5,162,984, of SGS-Thomson Microelectronics SA. A triac or equivalent thereof is used in place of the manual switch T.

2

A triac acts to conduct in either direction after the application of a negative (active low) pulse to its gate terminal, until the voltage across its two main terminals falls below a minimum value. By applying a gate pulse soon after every mains zero crossing point, the triac approximates to a short circuit. The introduction of such a short circuit provides the changeover from the bridge rectification mode shown in FIG. 1A to the voltage doubling rectification mode shown in FIG. 1B.

An alternating voltage is a voltage which undergoes successive upper and lower excursions, respectively more and less positive than a baseline voltage, such baseline voltage being the time average of the alternating voltage. For a mains alternating voltage, the baseline voltage is at the ground (zero volts) level.

The automatic voltage sensitive switch circuit described in the patent is a circuit containing several voltage comparators: these are used to detect peak voltage values to indicate a mains input AC voltage of the higher range, and to detect baseline crossing points to give timing information for triac gate pulses. Voltage reference sources are also built into the circuit to set the voltage reference points of the comparators. Means may be provided for generating many triac gate pulses per half-cycle of AC mains, to ensure efficient triggering in the presence of noise or disturbance on the AC lines. Filtering circuits may be included to remove such noise or disturbance from the voltage used for peak voltage detection.

Such integrated circuits are small and reliable. The cost of an automatic voltage sensitive switch circuit is reduced by reducing the number of components required, external to the integrated circuit.

Known automatic voltage sensitive switches employ a "single cycle" sensing mechanism, i.e. peak voltage level sensing is carried out on either only the upper or only the lower excursion of the mains voltage, linear extrapolation techniques being used to derive data for the other excursion.

This limitation is due to the fact that filtering, baseline crossing detection and peak voltage level sensing may only be carried out on a scaled representation of AC input voltages falling within a range limited by the two DC supply voltage levels of the control circuit of the automatic voltage sensitive switch. These are typically 0 V and 9 V. The AC input voltage is scaled down for input to the control circuit, but as it is centred on 0 V, the mains baseline, only one of the upper and lower excursions of the scaled AC voltage will fall within the allowed range for peak voltage level sensing.

Referring to FIG. 2, an embodiment of such an automatic voltage sensitive switch is shown. A doubler/bridge circuit 20 includes a triac T switching element; nodes 2, 4 are connected to the live L and neutral N lines of the AC mains, and receive the AC input voltage $V_{LN}$. A diode $D_5$, a resistor $R_4$ and a capacitor C are respectively connected in series between the live line L and the neutral line N. Two resistors $R_1$, $R_2$ are connected in series between the live line L and the node 22 between the capacitor C and the resistor $R_4$. The voltage between the neutral line N and node 22 is the voltage $V_C$ across the capacitor C. The automatic voltage sensitive switch control circuit 24 receives a first input voltage $V_{SS}$ from the node 22 and a second input voltage $V_4$ from the neutral line N and a third, 'composite', input voltage, $V_M$ from the node 26 between resistors $R_1$, $R_2$, and supplies an output voltage $V_G T$ through a resistor $R_g$ to the gate G of the triac T.

Diode $D_5$, resistor $R_4$ and capacitor C form a half-wave rectifier and smoothing circuit and provide a DC supply voltage $V_C$ to the automatic voltage sensitive switch control circuit 24. $V_{SS}$ is taken as a ground voltage for the circuit. It is at a voltage $V_C$ less than the voltage of the neutral line N. (For example, 9 V less as fixed by a regulator within the control circuit). The AC input voltage $V_{LN}$ is applied to the potential divider comprising resistors $R_1$, $R_2$. The composite voltage $V_M$ received by the control circuit 24 is a scaled down AC input voltage, displaced by a small DC offset, given by:

$$V_{LN} = V_2 V_4,$$

where $V_2$ and $V_4$ denote the instantaneous voltages at nodes 2 and 4, respectively.

$$\begin{aligned}
V_{LN} &= V_2 - V_{SS} - V_4 + V_{SS} \\
&= V_2 - V_{SS} - (V_4 - V_{SS}) \\
&= V_2 - V_{SS} - V_C \quad [1]\\
V_{LN} + V_C &= V_2 - V_{SS}
\end{aligned}$$

Also, $$V_M = (V_2 - V_{SS}) \times \frac{R_2}{R_1 + R_2}.$$

Using equation [1], $$V_M = \frac{R_2(V_{LN} + V_C)}{R_1 + R_2}$$

Hence, both the scaled AC input voltage and the DC bias depend on the values of $R_1$ and $R_2$. Their values are chosen such that, for DC supplies of 0 V and 9 V to the control circuit, the peak voltage of $V_M$ will be less than 9 V in the presence of the highest possible instantaneous line voltage. For example, if $R_1=1M\Omega$ and $R_2=18k\Omega$, $R_2/(R_1+R_2) = 0.0177$, and the peak voltage for a 264 Vrms AC input would be $264 \times \sqrt{7} \times 0.0177 = 6.60$ V. The input voltage to the control circuit $V_M$ would be an AC voltage of 6.60 V peak, almost centred on 0 V, but offset by $0.0177 \times V_C = 0.16$ V. In this way, only the positive peak voltages of $V_M$ will fall within the allowed range of input voltages, fixed at $V_4+0.6$ V to $V_{SS}-0.6$ V by input protection devices in the control circuit 24. The DC offset of 0.16 V means that the baseline of the composite voltage $V_M$ is at 0.16 V, and baseline crossing points may be detected, including hysteresis, by detecting when $V_M$ crosses 0.05 V and 0.25 V, for example.

FIGS. 3 and 4 show example input and output signals for the known automatic voltage switches carrying out comparison operations on the input voltage described. A scaled AC input voltage $V_{IN}$ is clipped by the input protection devices to remain within the range R, to obtain a measurable composite voltage $V_M$. A pulse PD is produced when $V_M$ exceeds a certain threshold voltage $V_{TP}$. Pulses CS represent the times during which $V_M > 0$ V. The inverse of this signal is produced within the control circuit 24. A short pulse is produced at each rising edge of CS and its inverse, which are added to form the signal ZC, which indicates the baseline crossing points of $V_M$, and hence the mains zero crossing points.

Peak detection pulses PD are produced at the peak of every upper excursion for a high range AC input voltage, using a comparator whose switching threshold is set to detect a voltage $V_{TP}$ in excess of the peak voltage of the highest scaled AC voltage of the lower range. For example, $V_{TP}$ may correspond to an instantaneous AC input voltage of 220 V, the peak value of a 156 Vrms AC input voltage. The threshold voltage must be carefully chosen, as AC mains voltages are subject to variation from time to time, resulting in the fact that the separation between a low range AC input voltage and a high range input voltage may be as small as 30 Vrms (140 Vrms to 170 Vrms).

Such peak detection pulses PD, disable the generation of triac pulses $V_GT$.

As shown in FIG. 4, no peak detection pulses PD are produced for low voltage AC input as the composite voltage $V_M$ never passes the $V_{TP}$ threshold. As described above, a comparator whose switching threshold is the baseline voltage level produces the comparison signal CS. Its inverse is also produced, and short pulses are generated at each rising edge of both CS and its inverse. The sum of these short pulses is the mains zero crossing indication signal ZC.

Internal logic then uses pulses PD to extrapolate corresponding data for the other excursion, and to generate triac gate firing pulses $V_GT$, a certain delay after each mains zero crossing point.

Voltage level detection is limited to one excursion only per cycle due to input protection devices, which limit the composite voltage $V_M$ to the allowed range R in FIGS. 3 and 4, being 0.6 V either side of the supply voltages. This eliminates any possibility of performing measurements on the other excursion per cycle of the waveform, in this example, the negative excursion.

Circuitry built into the control circuit 24 verifies a change in the apparent voltage range for at least two mains cycles before changing from bridge rectifier mode to voltage doubling rectification mode, so as to avoid the possibility of doubling a high range AC input voltage after a brief drop in AC input voltage.

A temporal filter is included within the control circuit to reduce the effects of glitches, sags, spikes and voltage surges. This is only active on input voltages which lie within the range R.

The limitation which is imposed on this circuit, in that it can perform filtering and voltage level sensing on only one half of the AC mains input signal results in several drawbacks.

Due to the voltage amplitude sensing on one half of the waveform only, there is the possibility of doubling a whole cycle of high voltage mains which may appear during an unsensed excursion of the AC input. Turn-off to non-doubling mode will not occur until the next baseline crossing after sensing has been performed on a sensed excursion of the input AC cycle. This could lead to damage to the bulk smoothing capacitors $C_1$, $C_2$ and the load L, due to one whole mains cycle of voltage far exceeding the device ratings, e.g. 480 V DC, being applied, as the DC output voltage will become double the AC input voltage for one whole cycle.

Furthermore, the filtering described is not effective on half the wave, leaving the control circuit vulnerable to damage caused by such transients on the unsensed portion of the AC input wave. To date, these deficiencies have been tolerated.

Automatic voltage switches using the detection of a DC rectified version 25 of the AC input voltage are also known, for example as described in U.S. Pat. No. 4,665,323, but these have the disadvantage of requiring additional high voltage diodes, smoothing capacitors and power resistors, which cannot be included in an integrated circuit, and therefore leading to a complex and expensive solution.

Automatic voltage switching circuits also exist in discrete form, whereby the circuit contains a voltage comparator, with one input referenced to a zener diode, to detect rectified or scaled AC voltages above a certain upper or lower threshold, as defined by the zener diode, and circuitry to provide triac gate firing pulses when required.

The object of the current invention is to provide a DC voltage supply circuit for rectifying an alternating voltage, using a minimum of discrete components, whilst improving sensing accuracy and reducing the circuit cost and complexity.

SUMMARY OF THE INVENTION

The invention provides voltage level sensing during both positive and negative half cycles of the AC mains. This is achieved by adjusting the DC offset of the composite voltage, in order to bring the total composite voltage within the limits defined by the DC supply voltages, for the whole cycle of mains AC, and allow voltage level detection and filtering of the waveform over its whole cycle.

According to one aspect of the present invention, a DC voltage supply circuit is provided for rectifying an alternating voltage and supplying a DC output voltage at a substantially constant value. Such a voltage supply circuit includes: rectification circuitry for rectifying the alternating voltage; a voltage detection circuit for detecting, within upper and lower limits, peak values of said excursions for controlling said rectification circuitry; and a voltage shift circuit. The voltage shift circuit is arranged to receive the alternating voltage as an input, and connected to supply a composite voltage to the voltage detection circuit. It scales the input alternating voltage and shifts its baseline by a preselected DC bias, in order that the excursions fall within the upper and lower limits so that the voltage detection circuit is operable to detect peak values of both upper and lower excursions. If the input alternating voltage has a baseline other than at 0V, the baseline voltage will also be scaled and included in the scaled alternating input voltage. The composite voltage is the sum of the DC bias voltage and the scaled alternating input voltage.

Such a DC voltage supply circuit may be operable within at least two distinct ranges of values of the alternating voltage. The output of the voltage detection circuit indicates the range containing the applied alternating voltage. The rectification circuitry has a number of modes equal to the number of distinct ranges of values of the alternating voltage, and the mode of operation of the rectification circuitry is selected according to the range indicated.

Baseline crossing detection circuitry may be included to detect the times at which the input alternating voltage crosses its baseline; and the rectification circuit includes a switch, e.g. a triac, for selecting the mode of operation. The baseline detection circuitry is then used to generate control signals to the switch. These control signals are pulses when the switch is a triac. The rectification circuitry may be a doubler/bridge rectifier, with two modes of operation.

The required preselected DC bias may be derived from DC supply voltages to the voltage detection circuit, while the scaled alternating input voltage may be provided by a resistive or capacitive divider network placed between the alternating input voltage and one of the voltage detection circuit supply voltages. The DC bias is then selected by controlling the DC current through one of the elements of the resistive divider.

The voltage detection circuit preferably contains a plurality of voltage comparators, receiving a plurality of voltage references each corresponding to a threshold to be detected. In one embodiment of the invention, the reference voltages are each defined as a voltage which tracks the baseline of the composite voltage, being a variable voltage, the reference voltage remaining at a fixed voltage therefrom independently of the variations in $V_C$. Accordingly, another aspect of the invention provides a voltage generation circuit including a reference voltage generator generating a reference voltage which is constant with respect to a ground voltage, a voltage multiplication circuit for multiplying the reference voltage by a certain multiple to provide the fixed voltage, and an offset circuit for offsetting the fixed voltage by the varying voltage.

Such a circuit may include a first operational amplifier connected so as to receive both the reference voltage and a DC bias, and producing an output voltage equal to the preselected DC bias minus a predetermined multiple of the reference voltage $V_{BG}$. A second operational amplifier has one input connected via a first resistance to the output of the first amplifier and another input connected to receive the preselected DC bias. The second amplifier has an output connected via a second resistance to its said one input. The first and second resistances are preferably equal. Thus, the second operational amplifier produces an output voltage equal to the preselected DC bias plus the predetermined multiple of the reference voltage $V_{BG}$. The first and second resistances may be provided by a resistive divider network including a set of nodes connected between the output of the first amplifier and the output of the second amplifier, whereby a different required voltage reference is available at each node.

Alternatively, and according to another aspect of the invention, a reference voltage generation circuit may be provided which includes a fixed reference current generator generating identical currents through two series portions of one circuit branch, at least one portion including a resistive element, a node between the two series portions being connected to receive the varying voltage. The varying voltage may be a fraction of the supply voltage to the circuit. The circuit branch includes a first transistor of a first channel type, a resistive element and a first transistor of a second channel type respectively connected between the supply voltage to the circuit and the ground voltage.

A detailed description of certain particular embodiments of the present invention will hereinafter be described, by way of examples, with reference to the accompanying diagrams.

BRIEF DESCRIPTION OF THE DRAWINGS

FIG. 15 shows input and output signals of the circuit of FIG. 14.

DESCRIPTION OF THE PREFERRED EMBODIMENT

Figure 5:
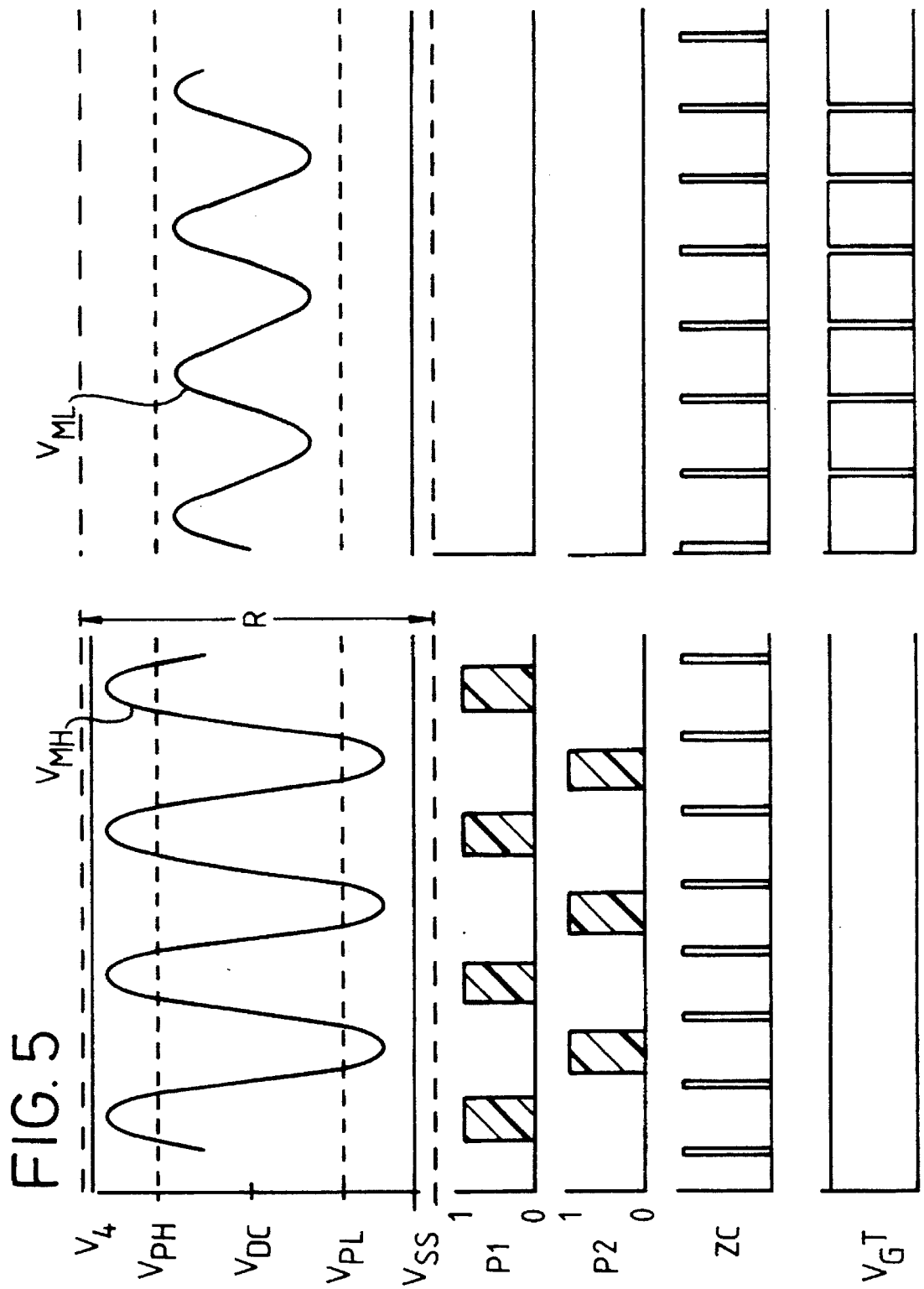
FIG. 5 shows input and output signals of a circuit according to an embodiment of the present invention.

FIG. 5 illustrates the operation of the circuit of the invention. Two cases are illustrated: one for the case where a high range AC input voltage is applied, the second where a low range input voltage is applied. Scaled AC input voltages are shifted by a DC offset voltage $V_{DC}$, to produce composite voltages $V_{MH}$, $V_{ML}$. An upper threshold voltage $V_{PH}$ and a lower threshold voltage $V_{PL}$ are defined. The allowed range R of input voltages to the control circuit is shown. When a high voltage range composite voltage $V_{MH}$ is applied to the circuit, positive peak detection pulses P1 are produced when the composite voltage $V_{MH}$ exceeds the upper threshold $V_{PH}$, and negative peak detection pulses P2 are produced when the composite voltage $V_{MH}$ falls below the lower threshold voltage $V_{PL}$, the thresholds being fixed within the circuitry using an internal voltage reference. Mains zero crossing indication signal ZC produces a pulse every time the composite voltage $V_{MH}$, $V_{ML}$ crosses the baseline voltage of $V_M$, whatever the level of the AC input, using comparators set to detect the crossing of the baseline voltage for the composite voltage $V_{ML}$, $V_{MH}$. When the AC input voltage has a baseline at 0 V, the baseline voltage of $V_M$ is equal to the DC offset voltage $V_{DC}$. In this way, timing and voltage level information may be gained for the whole AC cycle. When peak detection pulses P1, P2 are produced, no triac gate pulses are produced and the triac gate voltage $V_GT$ remains at the high (inactive) state. For a low range AC input, no peak detection pulses are produced as the composite voltage $V_{ML}$ crosses neither the upper nor the lower threshold voltages $V_{PH}$, $V_{PL}$; active low triac gate pulses $V_GT$ are produced, a certain time after each mains zero crossing indication pulse ZC. Hysteresis may be included for each peak or baseline crossing detection, to avoid noisy detection, and provide system level hysteresis for triac stability. This will require two thresholds for each detection.

The scaling ratio and the DC offset $V_{DC}$ of the composite voltages, $V_{MH}$, $V_{ML}$ are chosen such that even for the highest possible AC input, the composite voltage $V_{MH}$ used by the control circuit lies within the allowed range R for its entire cycle. Peak detection can then be performed during both the positive and negative half cycles of the AC input.

The required DC offset voltage $V_{DC}$ may be obtained by passing a DC current of known value through a finite resistance also of known value, and summing the resulting potential with a representation of the AC mains input voltage.

Figure 1A:
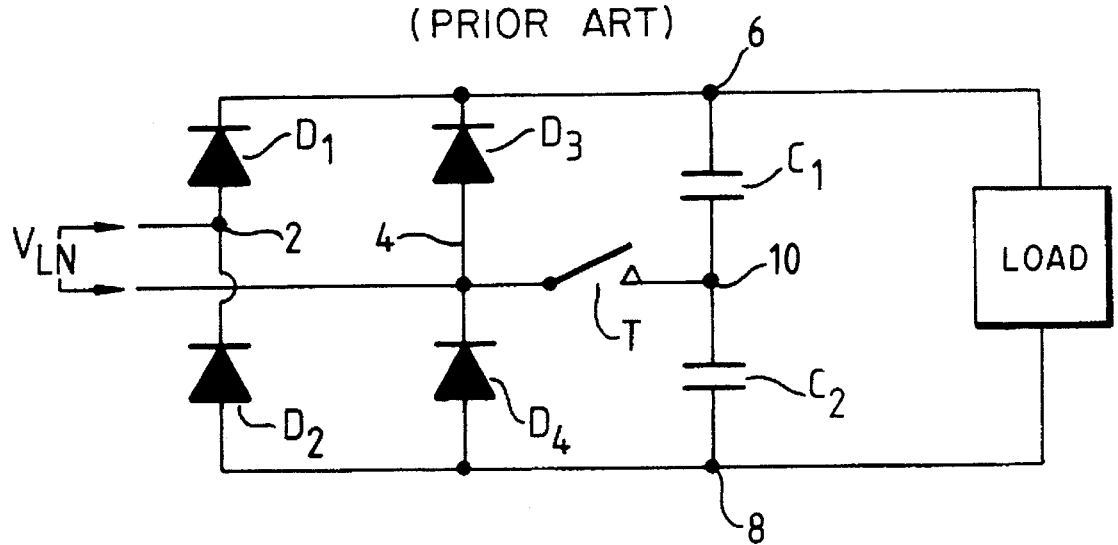
FIG. 1A shows a circuit diagram of a manual doubler/bridge circuit in bridge rectification mode.
Figure 1B:
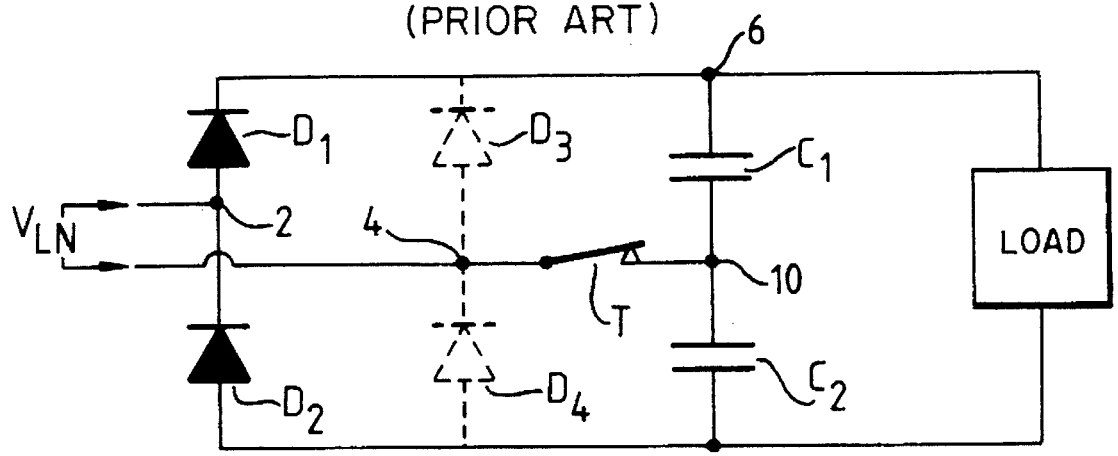
FIG. 1B shows a circuit diagram of the manual doubler/bridge circuit in voltage doubling rectification mode.
Figure 2:
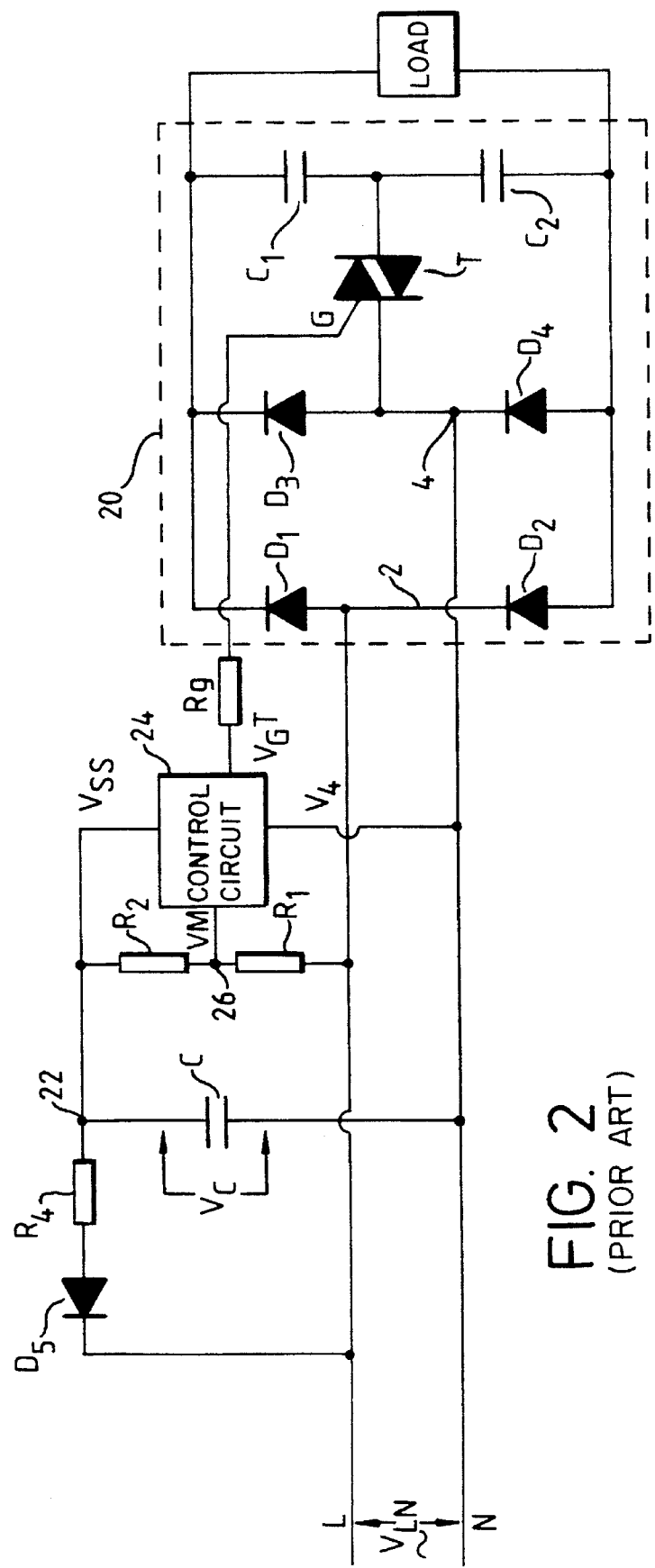
FIG. 2 shows a circuit diagram of an automatic voltage sensitive switch circuit of the prior art.
Figure 3:
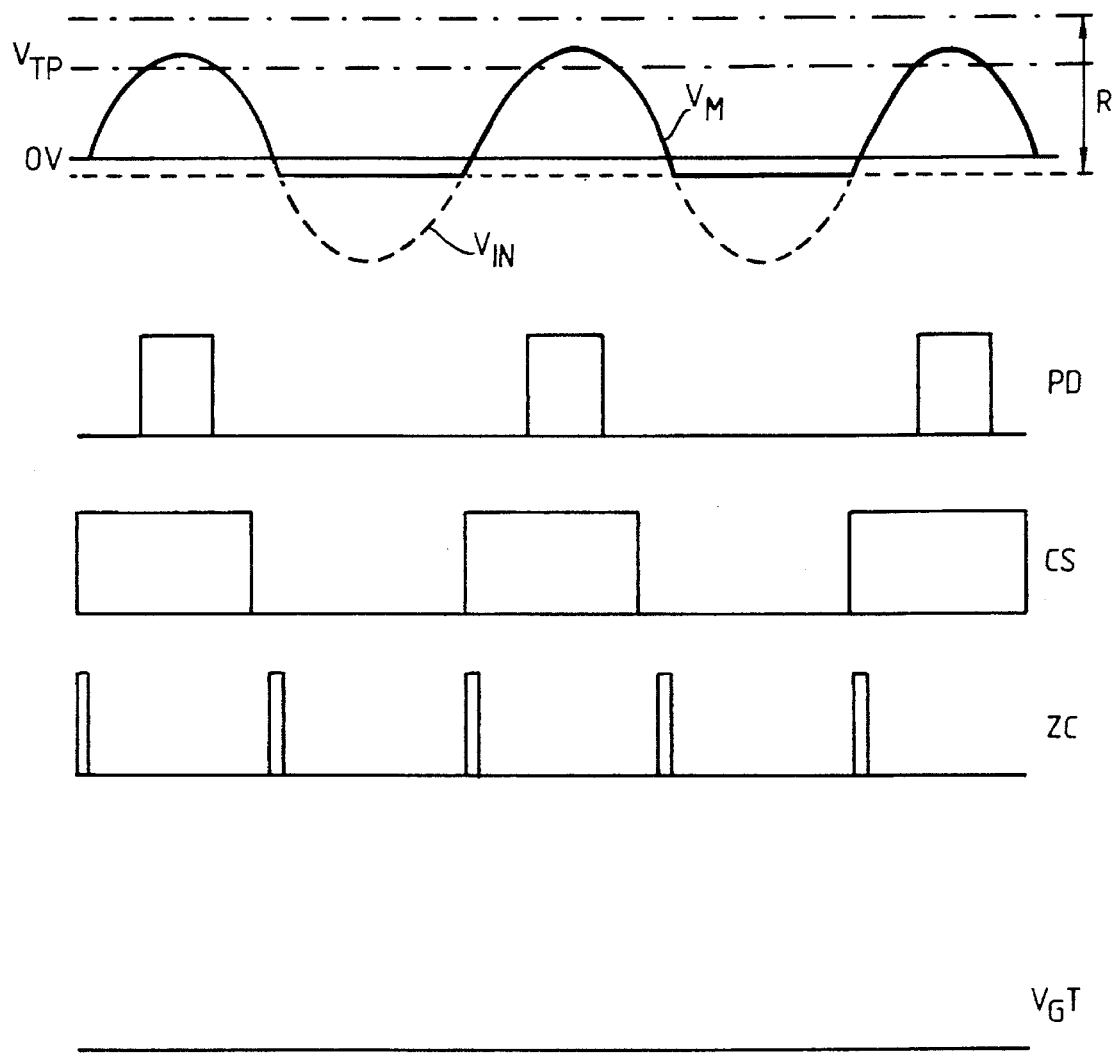
FIG. 3 shows input and output signals of the circuit of FIG. 2 when subjected to a high range AC input voltage.
Figure 4:
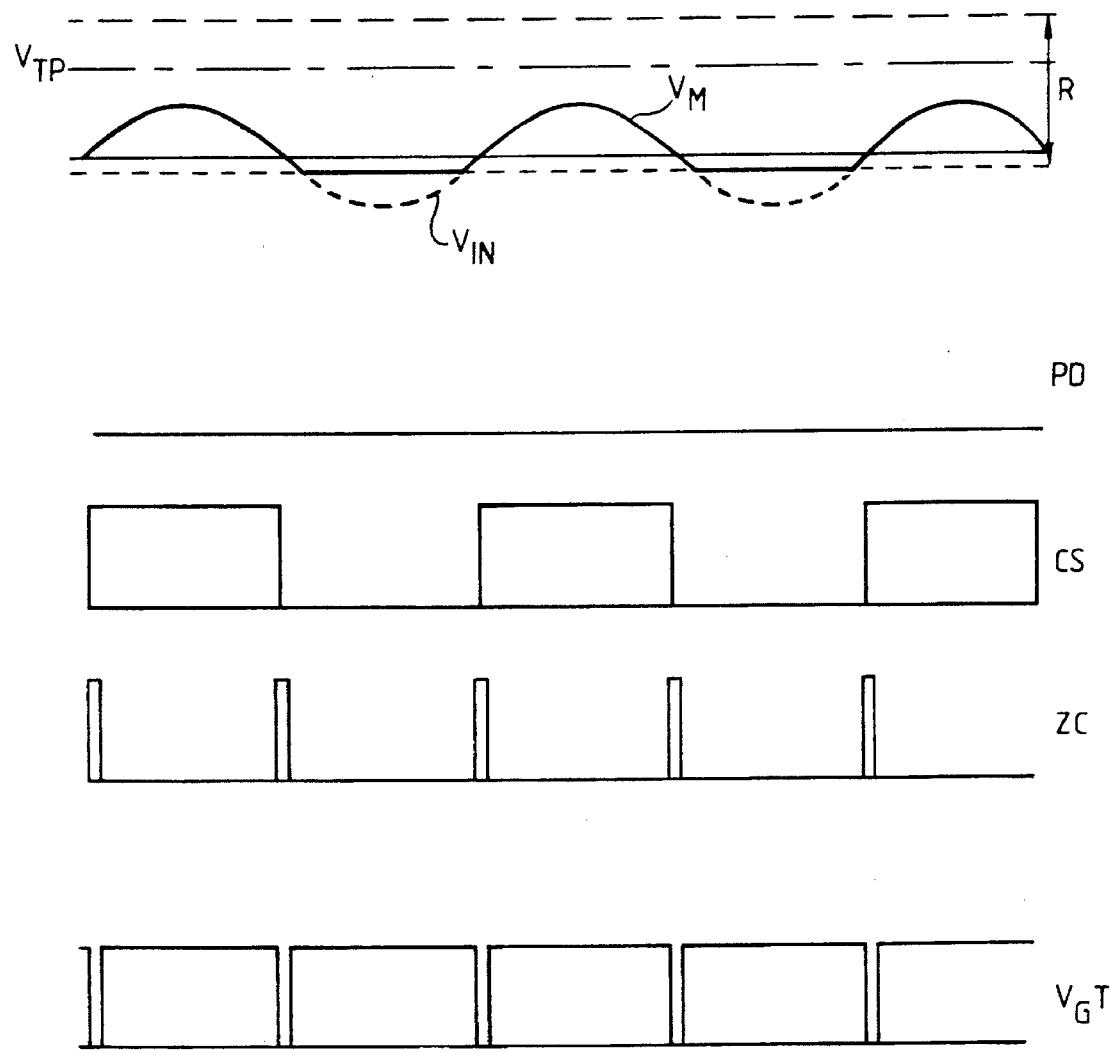
FIG. 4 shows input and output signals of the circuit of FIG. 2 when subjected to a low range AC input voltage.
Figure 6:
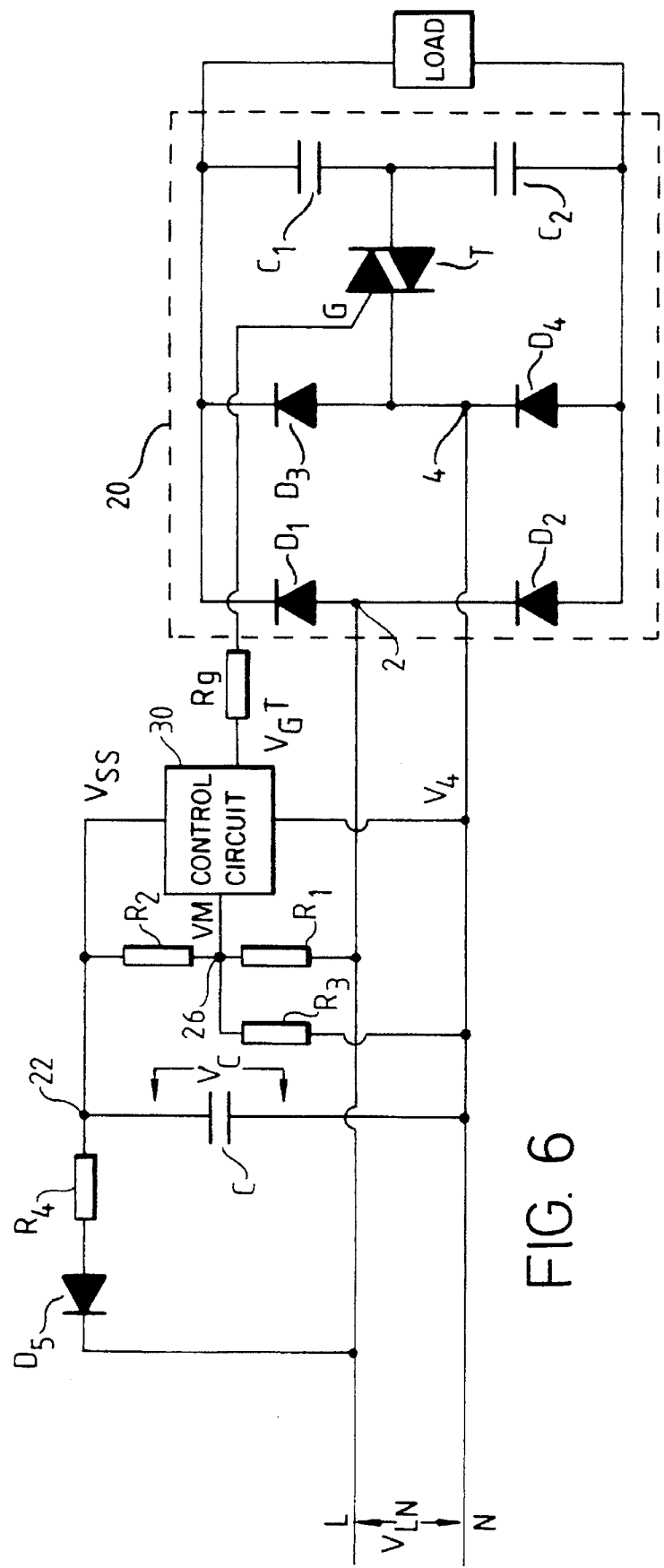
FIG. 6 shows a circuit of an automatic voltage sensitive switch circuit according to an embodiment of the present invention.

FIG. 6 shows an automatic voltage switch control circuit according to the current invention. The circuit is similar to that of FIG. 2, and similar features have similar reference labels. A resistor $R_3$ is placed between the node 26 and the neutral AC input line N. The control circuit 30 includes functions additional to those included in the control circuit 24 of FIG. 2, to enable it to perform voltage level detection during both positive and negative excursions of the alternating input voltage $V_{LN}$.

The AC input voltage $V_{LN}$ is scaled by the use of a resistive divider $R_1$, $R_2$. The resistor $R_3$ is included in the circuit to supply an additional DC current through a part $R_2$ of the resistive divider in order to increase the DC offset of the composite voltage $V_M$ to the control circuit. Such DC current is conveniently supplied by the DC supply $V_{SS}$ to the control circuit 30, in this case supplied from the AC input voltage by use of a simple half-wave rectifier $D_5$ and smoothing circuit C, $R_4$.

The value of the resistor $R_3$ is preferably such as to achieve a DC bias voltage $V_{DC}$ equal to the average of the supply voltages $V_{SS}$, $V_4$ of the control circuit 30.

Preferably, a DC offset of $V_C/2=4.5$ V is required for $V_M$, to place the composite voltage $V_M$ at the midpoint of the allowable range, with a 9 V supply to circuit 30, provided that the alternating input voltage has a baseline of 0 V. The DC offset is the value of $V_M$ when the AC input voltage $V_{LN}= 0$ V.

If, as discussed above, $R_1=$ 1MΩ and $R_2=$ 18kΩ, a negligible amount of current is drained through $R_1$; $R_2$ and $R_3$ effectively form a DC voltage divider between the $V_{SS}$ voltage and the neutral line voltage $V_4$. We therefore require that:

$$V_C \times \frac{R_2}{R_2+R_3} = \frac{V_C}{2},$$

or $R_3= R_2$, giving $R_3=$ 18kΩ.

Figure 7:
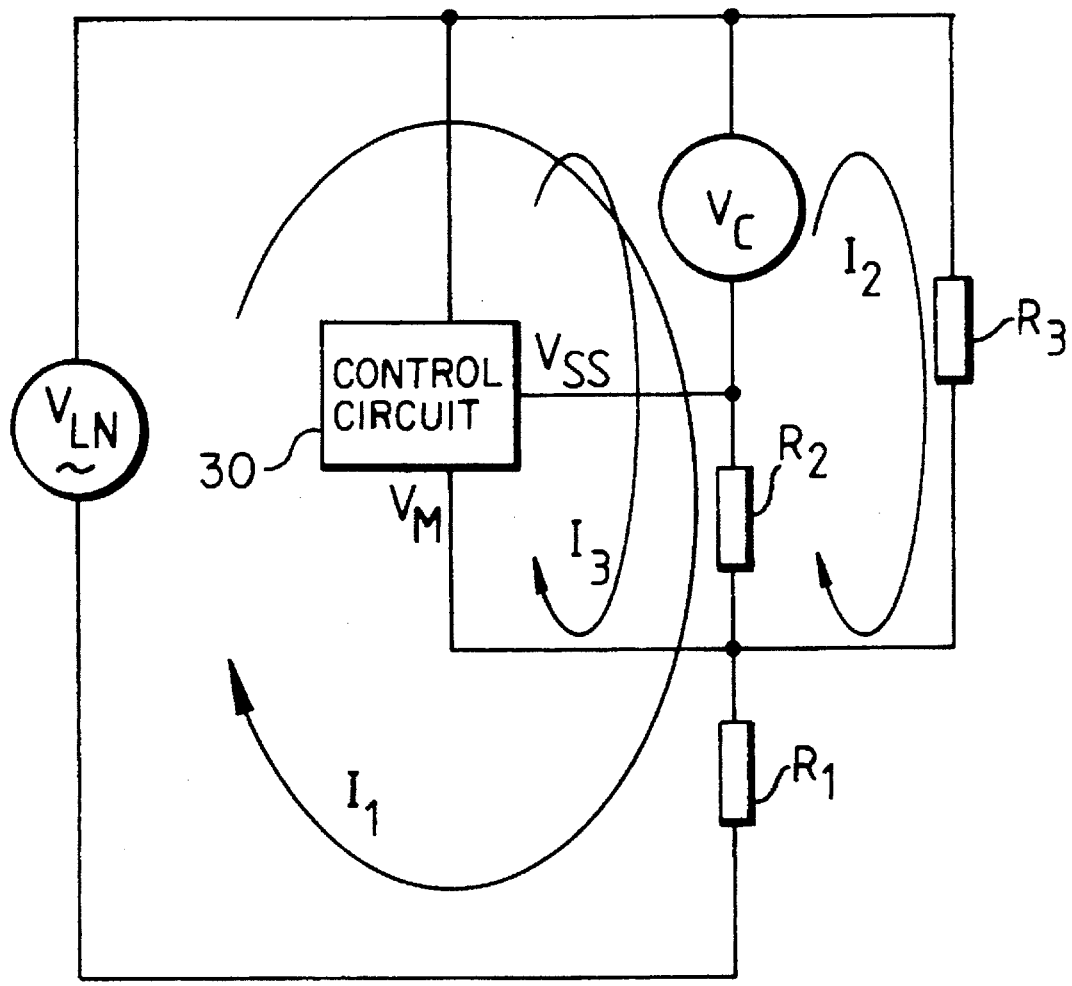
FIG. 7 shows a current loop diagram of part of the circuit of FIG. 6.

FIG. 7 shows a simplified current loop diagram of the resistive divider and DC biassing circuitry of the circuit of FIG. 6. A current $I_1$ flows from the AC input lines, represented by the voltage source $V_{LN}$, though the voltage source $V_C$ (which represents the capacitor C), through the resistors $R_2$ and $R_1$ back to the AC lines. A current $I_2$ flows from the voltage source $V_C$ through the resistors $R_3$, $R_2$ back to the voltage source. A current $I_3$ flows from the voltage source, $V_C$, through the resistor $R_2$ and into the $V_M$ input of the control circuit 30.

Applying Kirchoff's law to the current loops shown in the diagram, and ignoring the control circuit input bias current $I_3$ which is of very small magnitude, $$V_M= R_2(I_1-I_2) \qquad [2]$$

$$V_{LN}= V_C+ (I_1-I_2)R_2+I_1R_1 \qquad [3]$$

$$V_C= I_2R_3+ (I_2-I_1)R_2 \qquad [4]$$

from which it follows that:

$$V_{LN}-V_C= I_1(R_1+ R_2)+I_2(-R_2) \qquad [5]$$

$$V_C= I_1(-R_2)+I_2(R_2+R_3) \qquad [6]$$

Substituting into equations [4] and [5] and using units of volts, kn and mA, for the known values of $V_C=9$ V, $R_2=R_3=18k\Omega$, it follows that:

$$V_{LN}-9\ V = I_1(1018) - 18 I_2 \quad [7]$$

$$9\ V = -18 I_1 + 36 I_2 \quad [8]$$

Multiplying the terms of equation [7] by 2 and adding with equation [8], $I_2$ is eliminated, with the result:

$$2\ V_{LN} - 9 = 2018\ I_1;$$

$$I_1 = (2\ V_{LN} - 9)/2018 \quad [9]$$

To test the result, the peak voltages which appear at $V_M$ are calculated, to make sure that they lie within the permitted range, being between 0 and 9 V, referenced to $V_{SS}$.
Thus, for a $V_{LN} = 373$ V, and according to equation [9], $$I_1 = 0.366 \text{ mA};$$

substituting this into equation [8] gives $$I_2 = 0.433 \text{ mA}.$$

From equation [2], it follows that $$V_M = 1.213 \text{ V},$$

thus above $V_{SS}$ and within the permitted range.

Similar calculations for the most negative instantaneous input voltage, when $V_{LN} = -373$ V gives $$V_M = 7.87 \text{ V},$$

thus below the neutral line voltage, and within the permitted range.

This means that the AC voltage will now be centred on the middle of the allowed range, and all the whole cycle of the AC input will stay within the allowed range, with suitably chosen resistor values for $R_1$, $R_2$, $R_3$. With the inclusion of the resistor $R_3$, the scaling factor for the AC input voltage is:

$$\frac{R_2 \| R_3}{R_1 + R_2 \| R_3},$$

Figure 8:
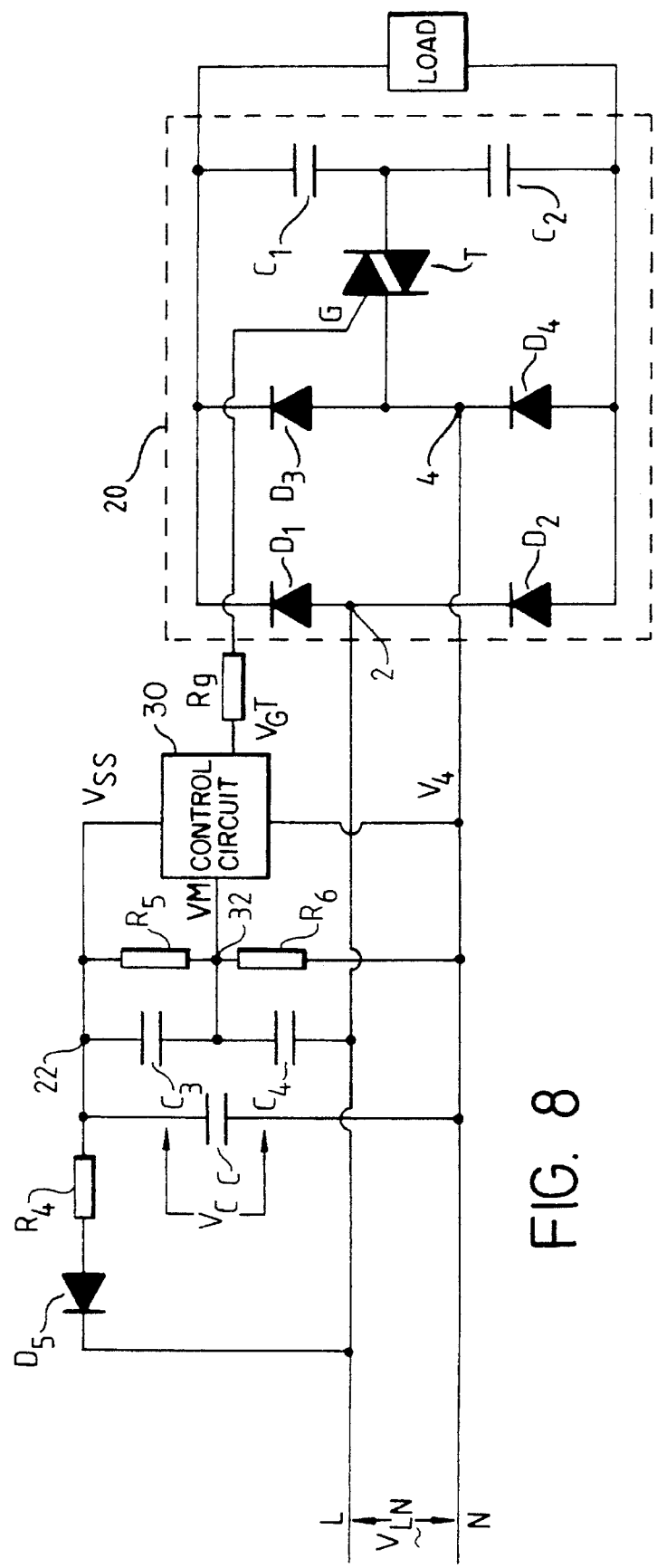
FIG. 8 shows a circuit diagram of an automatic voltage sensitive switch circuit according to a second embodiment of the invention.

FIG. 8 represents a second embodiment of the invention. The circuit is similar to the circuit of FIG. 6, and similar features have similar reference figures.

The alternating input voltage $V_{LN}$ is scaled by the use of a capacitive divider $C_3$, $C_4$. Capacitor $C_3$ is chosen to have an impedance value much smaller than that of $C_4$, to provide an AC component of composite voltage $V_M$ which is less than 9V peak to peak. For example, by choosing $C_4 = 0.012\ C_3$, the impedance of $C_3$ will be 0.012 times that of $C_4$, and the voltage across $C_3$ with a peak voltage of 264 Vrms mains voltage will be $264 \times \sqrt{2} \times (0.012/1.012) = 4.4$ V. Use of the capacitive divider $C_3$, $C_4$ removes any DC component from the input alternating voltage, which therefore may be considered as having a baseline voltage of 0 V. A resistive divider $R_5$, $R_6$ is placed across the DC supply voltages $V_4$, $V_{SS}$ to the circuit, and provides a DC offset voltage of $V_M$. To supply an offset voltage equal to the average of the two supply voltages, the two resistors $R_5$, $R_6$ must be of an equal value.

The composite voltage $V_M$ supplied to the control circuit 30 is then:

$$V_M = \frac{C_4 \cdot V_{LN}}{C_4 + C_3} + \frac{R_5 \cdot 9}{R_5 + R_6}.$$

If the supply voltages to the control circuit are 0 V ($V_{SS}$) and 9 V ($V_4$), the AC input voltage must be scaled by $C_3$, $C_4$ so that there is less than 9 V peak to peak, and be displaced by a DC offset voltage by $R_5$, $R_6$ so as to produce a composite voltage $V_M$ whose most negative peak is greater than 0 V, and the whose positive peak is less than 9 V.

Similar calculations may be performed for any other type of automatic voltage switch contemplated for use.

In the two embodiments of the invention described, peak voltage levels and mains zero crossing points are detected by applying the composite voltage $V_M$ to several voltage comparators, each supplied with a voltage reference point representing a threshold for the detection of a peak voltage, or a baseline crossing point. The required reference voltages may be set by use of a bandgap voltage reference, suitably amplified, and referenced to a ground potential such as $V_{SS}$. The amplified output of the bandgap voltage reference may be divided by a fixed resistive divider to provide a set of several reference voltages. Input voltage requirements of the voltage comparators and amplifiers may limit the permitted range of values of the composite voltage $V_M$ to between ($V_4 - 0.6V$) and ($V_{SS} + 0.6$ V).

This method has the drawback that any variation in the voltage $V_C$ across the capacitor C in FIG. 8, will be reflected in the magnitude of the composite voltage $V_M$, which includes a DC component $V_{DC}$, derived from $V_C$. Such variations in the voltage $V_C$ may be caused by the discharge of capacitor C during mains voltage irregularities, which lead to reduced charging of the capacitor C, as well as the possibility of repeated triac firing pulse generation, which will further drain the charge on capacitor C. Such mains voltage irregularities have a greater effect on the value of $V_C$ than they do on the magnitude of the alternating component of $V_M$. If $V_C$ is provided other than by the input alternating voltage, variations in current drains of other circuits connected to the same DC supply could also cause variations in $V_C$.

The reference voltages, however, being an amplfied bandgap voltage, and referenced to a ground potential $V_{SS}$, are independent of any changes in the voltage $V_C$ and thus are unaffected by any variations in this voltage. This will upset the measurement of alternating voltage magnitude and zero crossing points.

Figure 9:
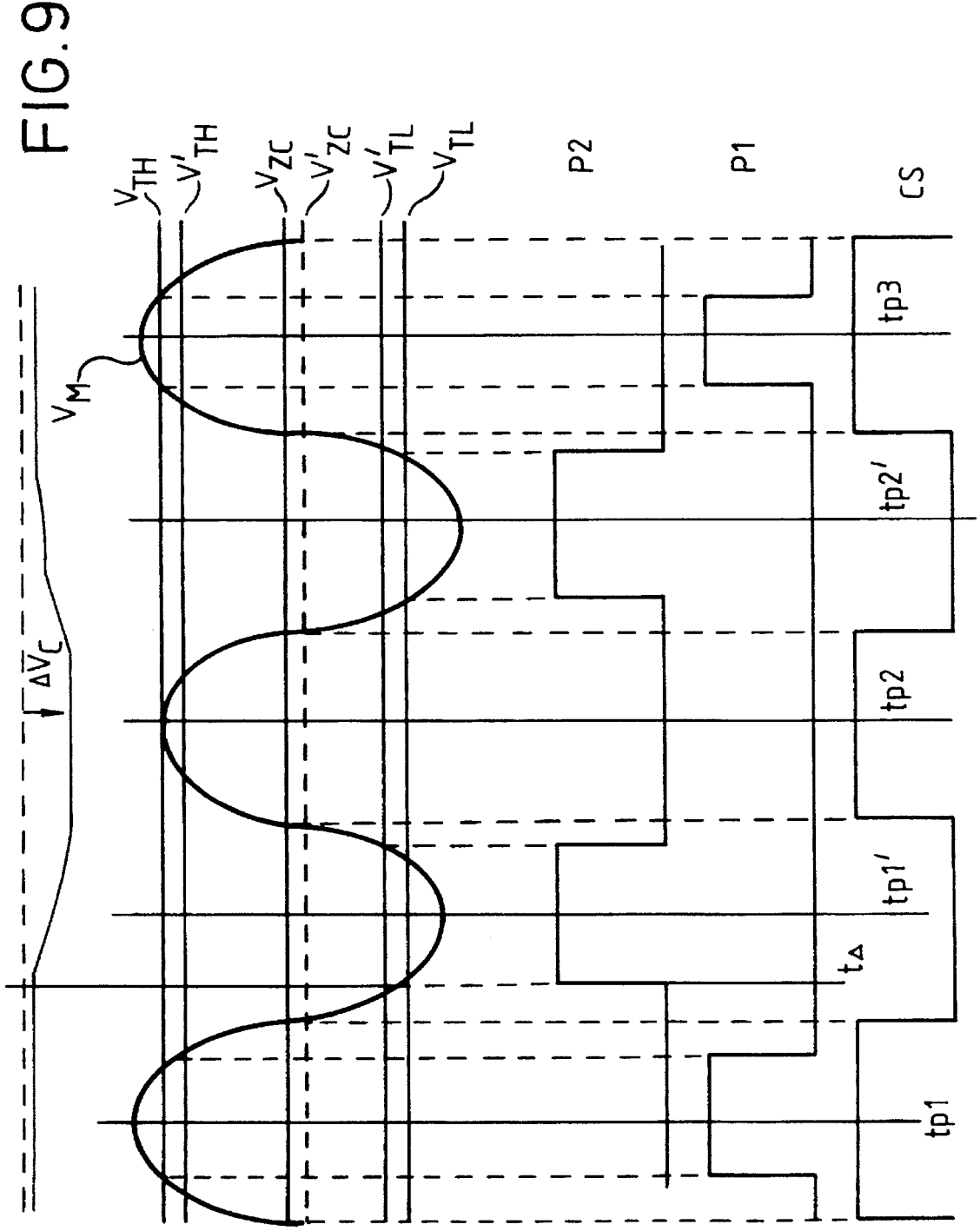
FIG. 9 shows an effect of a drop in supply voltage on the detection of voltage levels.

FIG. 9 illustrates the problem caused. The composite voltage $V_M$ represents the voltage applied to the control circuit during a period of high range alternating input voltage. The composite voltage $V_M$ has positive peaks at times $t_{p1}$, $t_{p2}$, $t_{p3}$ and negative peaks at times $t'_{p1}$, $t'_{p2}$. Both upper and lower peak detection thresholds, $V_{TH}$, $V_{TL}$ are included, with optional additional thresholds $V'_{TH}$, $V'_{TL}$ for hysteresis. Crossing of these thresholds by the voltage $V_M$ leads to the production of peak detection pulses P1, P2. The comparison signal CS changes state every time the composite voltage $V_M$ crosses the baseline crossing detection thresholds $V_{ZC}$, $V_{ZC}$.

A drop $\Delta V_C$ in voltage $V_C$ occurs at time $t_A$. As the composite voltage $V_M$ monitored by the automatic voltage sensitive switch control circuit 30 includes a DC offset voltage $V_{DC}$ equal to ½$V_C$, $V_M$ drops by ½$\Delta V_C$. Due to this, the positive peak voltage occurring at time $t_{p2}$ does not cross $V_{TH}$, the positive peak detection threshold. No peak detection pulse is therefore present on signal P1; a peak of high voltage input goes un-detected. When a negative peak voltage occurs at time $t'_{p2}$, the thresholds $V_{TL}$, $V'_{TL}$ are crossed early and late, respectively, causing a longer than usual pulse on signal P2. The voltage $V_C$ has not fully recovered by the time $t_{p3}$ the next positive peak occurs, and hence the peak detection pulse on signal P1 is of reduced width, and its rising and falling edges are out of phase with those of other cycles. Similarly, during this period of reduced $V_C$, the baseline crossing points, detected by the crossing of voltages $V_{ZC}$, $V'_{ZC}$ are out of phase with those of other cycles, and do not correspond to the location at which the mains input voltage actually crosses the zero voltage level.

Figure 10:
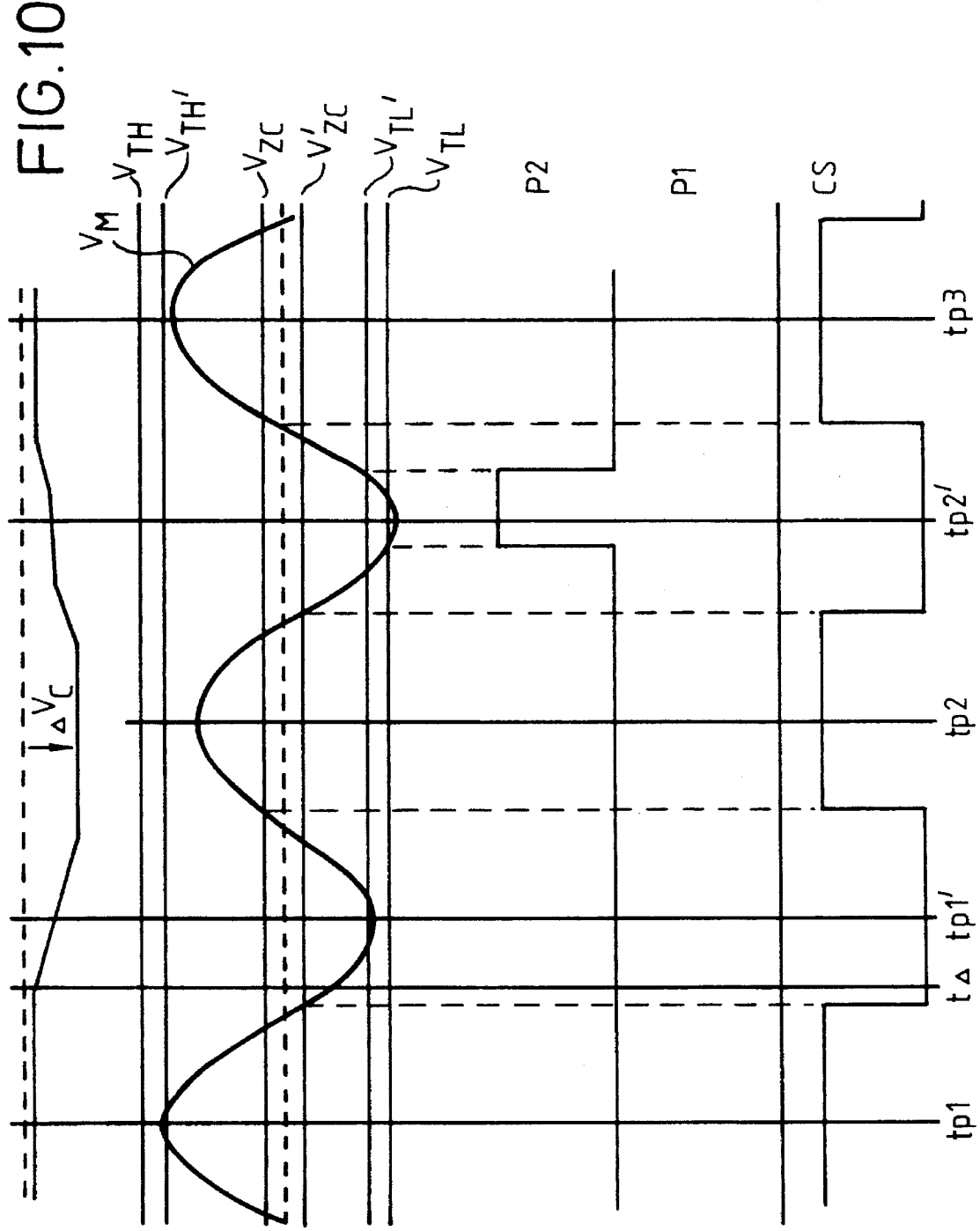
FIG. 10 shows another effect of a drop in supply voltage on the detection of voltage levels.

FIG. 10 shows another consequence of the independence of the reference voltages from the circuit supply voltage defined by $V_C$. $V_M$ is the composite voltage supplied to the control circuit while a low range alternating input voltage is present. Neither of the peak detection signals P1 and P2 produce pulses, as the signal $V_M$ never exceeds $V_{TH}$ or $V_{TL}$. The automatic doubler/bridge circuit is in voltage doubling rectification mode. However, as in FIG. 9, at time $t_A$ the voltage $V_C$ drops by an amount $\Delta V_C$. As discussed above, the magnitude of $V_M$ reduces, and at the negative peak at time $t'_{p2}$, the lower threshold $V_{TL}$ is crossed, and signal P2 produces a pulse, indicating a high range voltage. This will immediately stop voltage doubling mode, causing a temporary reduction in the output voltage of the rectifier circuit. Analogous problems may be encountered during a temporary increase in the value of $V_C$, and hence $V_{DC}$. Such behaviour is unacceptable for system level performance.

A voltage reference circuit will be discussed, wherein the reference voltages are affected by variations in the magnitude of the power supply voltage $V_C$, such that there is always a fixed voltage between each of them and the DC component $V_{DC}$ of the composite voltage $V_M$.

This is achieved by ensuring that the reference voltages track the DC offset $V_{DC}$ of the composite voltage $V_M$. As for the example above, this voltage may be $\frac{1}{2}V_C$. The DC component could, however, be any fraction of $V_C$, chosen such that the whole possible range of $V_M$ lies within the appropriate permitted range.

The definition of $V_M$ may be written:

$$V_M = \frac{1}{2}V_C + n \cdot V_{LN},$$

where n is a fraction suitably chosen such the whole range of $V_M$ lies within the range between the nominal values of $V_4$ and $V_{SS}$, for the highest expected value of $V_{LN}$.

As the voltages we require to detect for peak and zero crossing detection correspond to certain values of the AC input voltage $V_{LN}$, these may be detected by detecting the crossing of certain reference voltages corresponding to values of $n \cdot V_{LN}$. By defining each reference voltage as tracking the DC offset voltage $V_{DC}$, plus a certain fixed voltage $V_p$ which is the required certain value of $n \cdot V_{LN}$, the required reference voltages are obtained. These reference voltages will then vary in magnitude exactly as the DC offset voltage $V_{DC}$ varies. Both the DC offset voltage $V_{DC}$ and the certain fixed voltage $V_p$ are referenced to the ground voltage $V_{SS}$. The passing of a reference voltage then corresponds to:

$$V_M = \frac{1}{2}V_C + n \cdot V_{LN} = \frac{1}{2}V_c + V_p; \; n \cdot V_{LN} = V_p.$$

Figure 11:
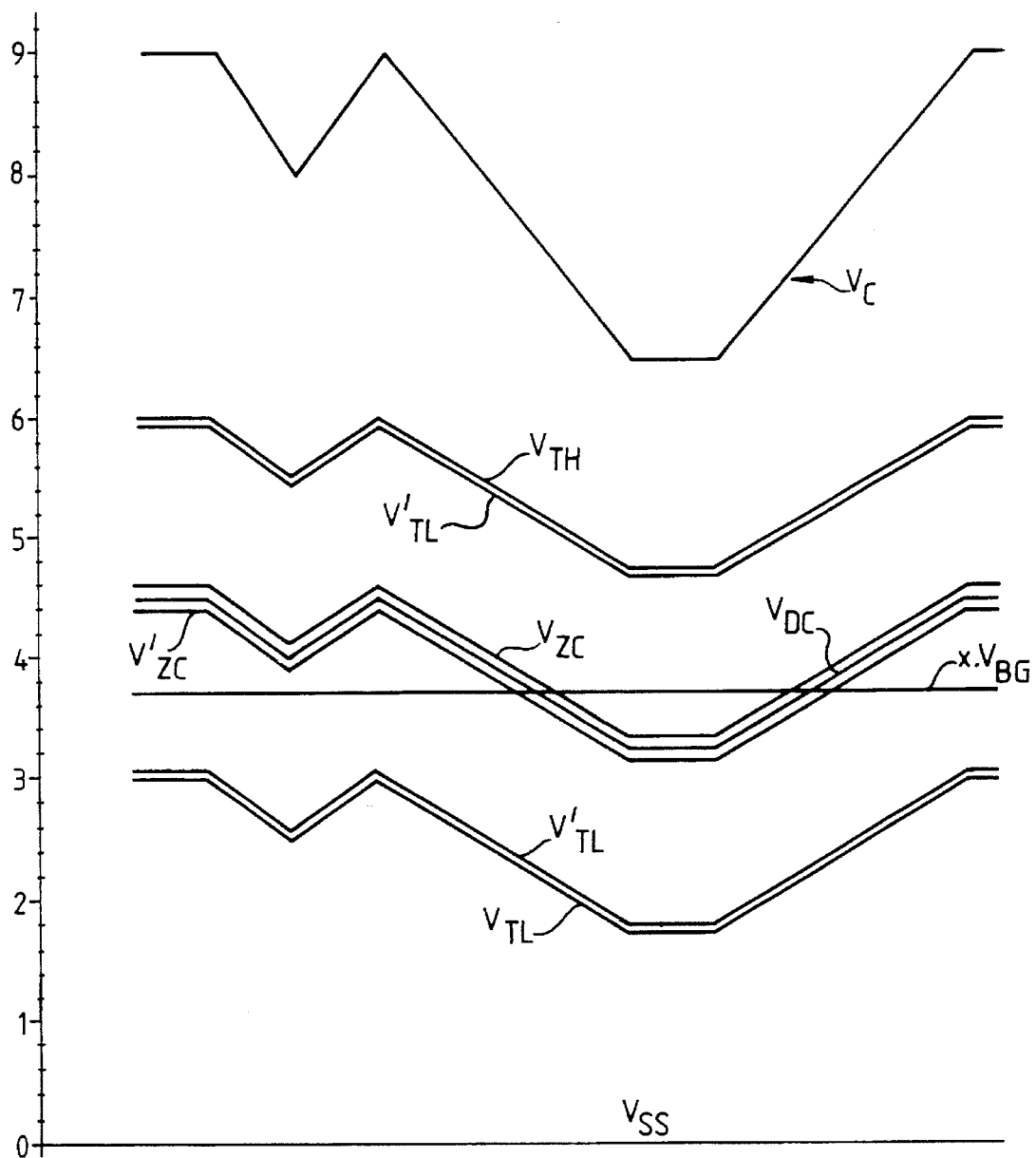
FIG. 11 shows the desired effect of a drop in supply voltage on reference voltages used in the circuit of the invention.

FIG. 11 shows the required function of the voltage reference circuit. All necessary reference voltages, $V_{TH}$, $V'_{TH}$, $V_{ZC}$, $V'_{ZC}$, $V'_{TL}$, $V_{TL}$ track variations in $\frac{1}{2}V_C$, in this example, or any other value that $V_{DC}$ may take. As the voltage $V_C$ varies, the values of all the reference voltages vary, keeping a constant difference between each reference voltage and $V_{DC}$. Voltage reference sources such as the amplified bandgap reference discussed above will supply a voltage $x \cdot V_{BG}$, constant with respect to the ground voltage $V_{SS}$. This, however, varies in magnitude when considered with respect to $V_{DC}$.

Figure 12:
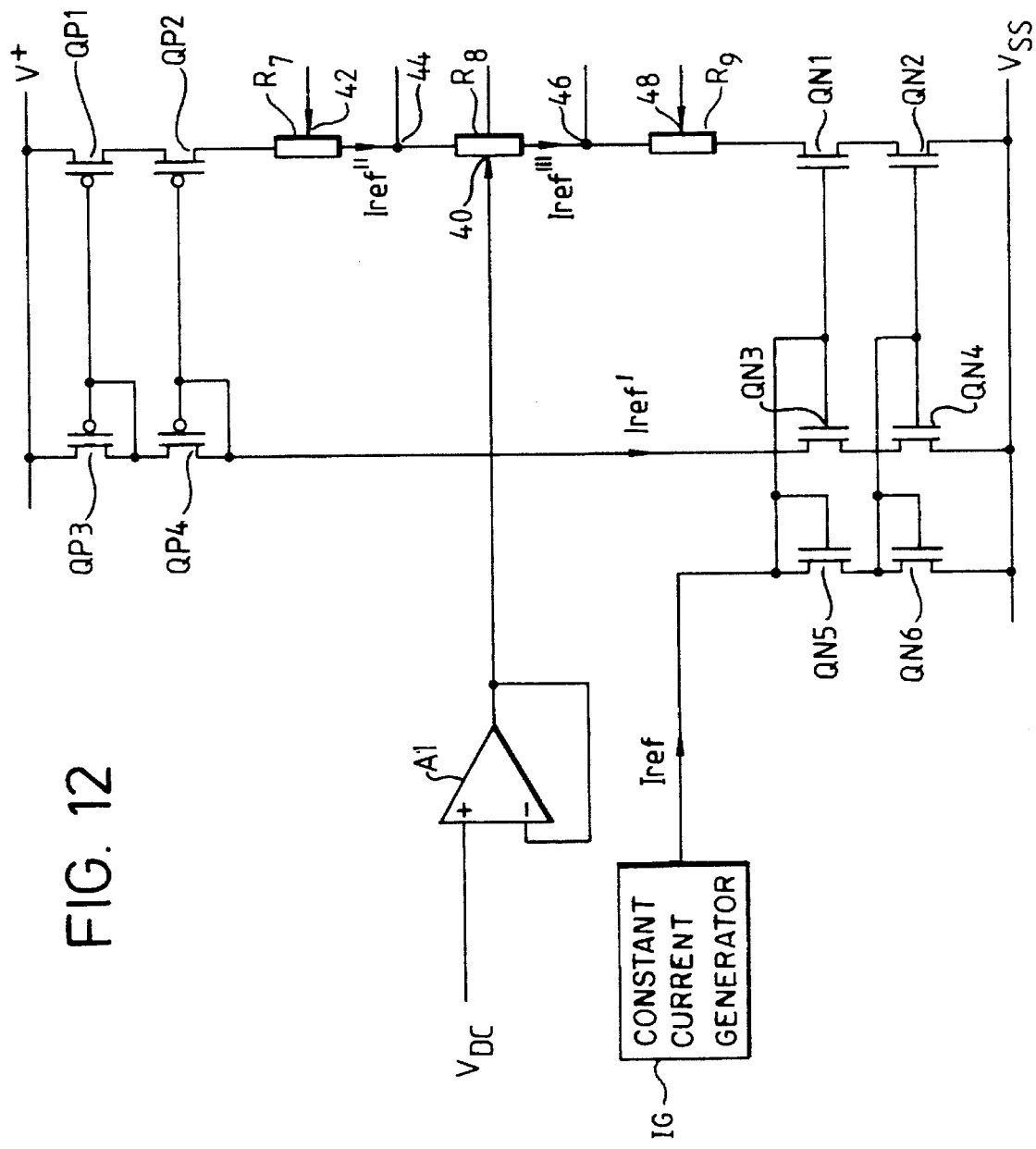
FIG. 12 shows a circuit for the generation of reference voltages.

FIG. 12 shows a circuit embodying such a voltage reference. A buffer amplifier A1 receives the DC offset voltage $V_{DC}$, and supplies it to node 40, at the centre of a resistive divider network comprising resistors $R_7$, $R_8$, $R_9$. Several nodes 42, 44, 46, 48 are tapped from this resistive divider network. This network is connected in series, and forms a first circuit branch, with two p-channel MOS transistors QP1, QP2 in series, connected also to the positive-most supply voltage $V_4$, and two n-channel MOS transistors in series QN1, QN2, also connected to a ground voltage $V_{SS}$.

A second, parallel, circuit branch has two p-channel MOS transistors QP3, QP4 and two n-channel transistors QN3, QN4 in series respectively between $V_4$ and $V_{SS}$. The p-channel transistors QP3, QP4 have their gates connected to the gates of transistors QP1, QP2 respectively, and to their own source terminals. The n-channel transistors QN3, QN4 have their gates connected to the gates of transistors QN1, QN2, respectively.

A third parallel circuit branch comprises two n-channel MOS transistors QN5, QN6 connected in series, the source of QN6 being connected to the ground voltage $V_{SS}$, the drain of QN5 being connected to the output of a constant current generator IG, which generates a constant current Iref through the transistors QN5, QN6. The gates of transistors QN5 and QN6 are connected to the gates of transistors QN3, QN4 respectively, and also to their own respective drain terminals.

The constant current generator IG passes its reference current Iref through the two n-channel transistors QN5, QN6. These are each connected as a current mirror with transistors QN3, QN4 respectively. An identical current, Iref', therefore flows through the second circuit branch. This second circuit branch consists of four transistors QP3, QP4, QN3, QN4, each connected as a current mirror with a corresponding transistor in the first circuit branch.

The first circuit branch comprises an upper portion, including transistors QP1, QP2, and resistors R7, R8 as far as node 40; and a lower portion comprising the rest of the branch, that is resistors R9, R8 from node 40, and transistors QN1, QN2. The current mirrors comprising transistors QP3, QP1, QP4, QP2 cause a current Iref", equal to Iref, to flow in the upper part of the first circuit branch. The current mirrors comprising transistors QN3, QN1, QN4, QN2 cause a current Ireif", equal to Iref, to flow in the lower portion of the first circuit branch. Hence, an identical current flows in each portion of the first circuit branch, and no current flows into or out of the output of amplifier A1.

The output of the buffer amplifier A1 holds the voltage $V_{DC}$ at node 40. The voltages at each of the nodes 42, 44, 46, 48 are then accurately held at voltages $V_{DC} \pm Iref \cdot Rt$, where Rt is the total resistance between the node in question and node 40. Hence, by selecting appropriate values for resistors $R_7$, $R_8$, $R_9$, all of which may be adjustable, accurate reference voltages are available for any desired value, with respect to the DC component $V_{DC}$. The difference between the voltage at each node and node 40 is fixed by the constant current source output Iref, and the adjustments and values of resistors $R_7$, $R_8$, $R_9$. If only voltages greater than $V_{DC}$ or only voltages less than $V_{DC}$ were required, resistors would only be necessary in either the upper or the lower portions of the first circuit branch.

The use of two current mirrors in series at each mirroring step (a "cascade stage") ensures a greater matching accuracy than would have been achieved by using a single current mirror in their place.

Although this circuit can provide the required voltage references of $V_{DC} \pm V_p$, it suffers from variations in the absolute value of the resistors, when implemented in integrated form, together with variations of resistance with temperature. The current source IG and the transistors may suffer from matching errors and tolerance deviations.

Figure 13:
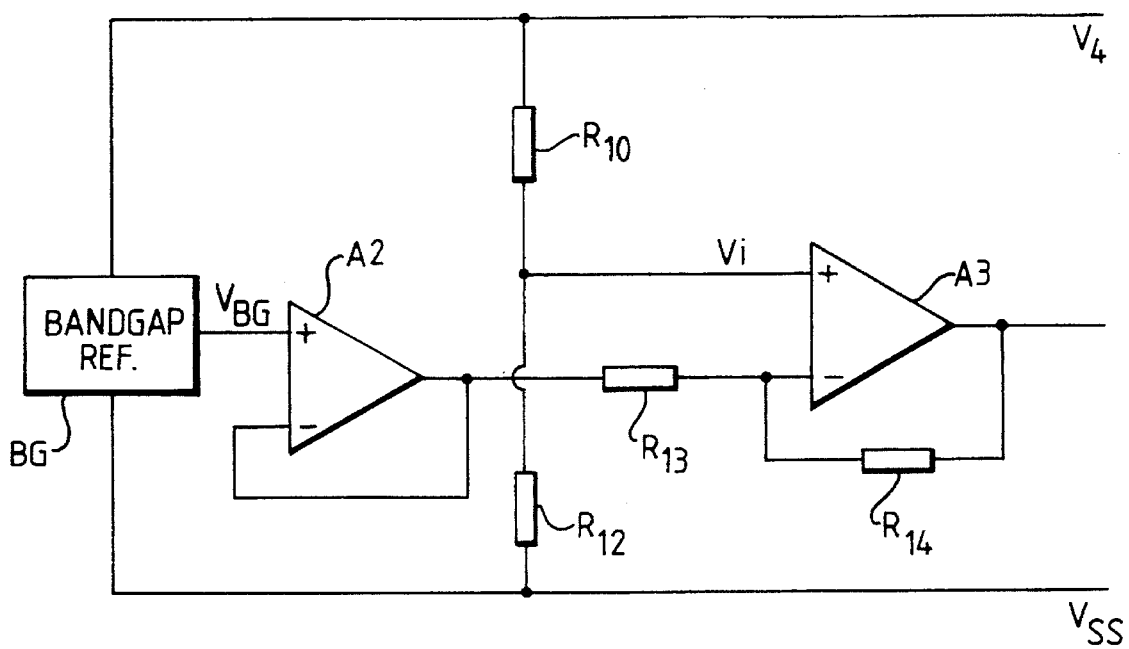
FIG. 13 shows another circuit for the generation of reference voltages.

FIG. 13 shows a second circuit for a voltage reference capable of the required functionality, which does not suffer from the above limitations. A bandgap voltage reference BG is supplied by the two available power supply voltages, $V_4$, $V_{SS}$ which have a difference of $V_C$. Its output voltage $V_{BG}$ is applied to the input of buffer amplifier A2, whose output will also be at voltage $V_{BG}$. A resistive divider network comprising resistors $R_{10}$, $R_{12}$ provides a DC voltage $V_i$ to a non-inverting input of an opamp A3. An inverting input of opamp A3 is connected to the output of the buffer amplifier A2, via a resistor $R_{13}$. A feedback resistor $R_{14}$ is connected between the output $V_o$ and the inverting input of the operational amplifier A3. As is normal with operational amplifiers, the inverting terminal will be at the same voltage as the non-inverting input.

The output voltage $V_{BG}$ of the voltage reference BG is at a fixed value with respect to the voltage $V_{SS}$, and is independent of any fluctuations in the supply voltage $V_C$. $V_i$ is a fraction of $V_4$ with respect to $V_{SS}$ and therefore proportionately follows any variation in the supply voltage $V_C$.

Considering the currents (which must be equal) through resistors $R_{13}$, $R_{14}$, $$\frac{V_i - V_{BG}}{R_{13}} = \frac{V_o \cdot V_i}{R_{14}}$$

$$V_i(1 + R_{14}/R_{13}) - V_{BG}(R_{14}/R_{13}) = V_o.$$

In this expression, the $V_i$ term is the DC offset term which must correspond to $V_{DC}$, and the $V_{BG}$ term corresponds to the fixed voltage $V_p$. The operational amplifier A3 thus performs both multiplication of $V_{BG}$ by $(R_{14}/R_{13})$ to obtain the fixed voltage $V_p$ and offsets $V_p$ by the voltage $V_{DC}$. To fit the example, where $V_{DC} = \frac{1}{2}V_C$, $V_i(1 + R_{14}/R_{13}) = \frac{1}{2}V_C$; $V_i = \frac{1}{2}V_C \cdot R_{13}/(R_{13}+R_{14})$.
This may be arranged by fixing $R_{12} = R_{13}$ and $R_{10} = 2 \cdot R_{14} + R_{13}$.

As $V_i$ is directly proportional to $V_C$, and provides a component of $\frac{1}{2}V_C$ at the output of amplifier A3, any variation $\Delta V_C$ of the voltage $V_C$ will be reflected with a variation of $\frac{1}{2}\Delta V_C$ at the output of amplifier A3. The $V_{BG}$ element remains unaffected by the variation in $V_C$, providing the required reference voltage $V_{BG}$, with reference to $V_{SS}$. The output voltage of amplifier A3 is therefore at a voltage $V_p$ less than $V_C$. The voltage $V_p$ never changes, whatever variation occur in $V_C$, provided that a minimum voltage is maintained, as required to ensure correct operation of the voltage reference BG. This minimum voltage may be around 4½V. The output of amplifier A3 therefore fulfills the function of providing a voltage reference which varies with $V_{DC}$, but which maintains a fixed value with respect to $V_C$, independent of variations of $V_C$.

This circuit allows the generation of any voltage below $V_{DC}$. To provide the required reference voltages above $V_{DC}$, an inverting buffer amplifier is used.

Figure 13A:
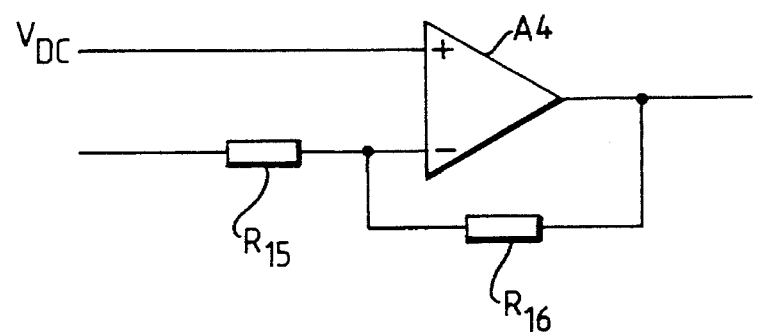
FIG. 13A shows further circuitry for the generation of reference voltages.

FIG. 13A shows an inverting buffer amplifier, used to provide the threshold voltages above $V_{BG}$. An operational amplifier A4 has a non-inverting input connected to $V_{DC}$, which may be set by a resistive divider between the power supplies. Equal resistances $R_{15}$, $R_{16}$ are connected between the inverting output and an output of amplifier A4, and the inverting input of amplifier A4 and the output of amplifier A3, FIG. 13, respectively.

As the output of amplifier A3, FIG. 13, is $V_{DC} - V_p$, and amplifier A4 is using $V_{DC}$ as a virtual ground, the output of this amplifier A4 will be $V_{DC} + V_p$, providing a reference voltage greater than $V_{DC}$, symmetrical with the corresponding reference voltage less than $V_{DC}$.

By using this circuit to supply both positive and-negative peak detection references $V_{TH}$, $V_{TL}$, a resistive divider may be set up between the outputs of A3 and A4, to supply each of the required reference voltages. This may advantageously combined with the function of resistors $R_{15}$, $R_{16}$.

Figure 13B:
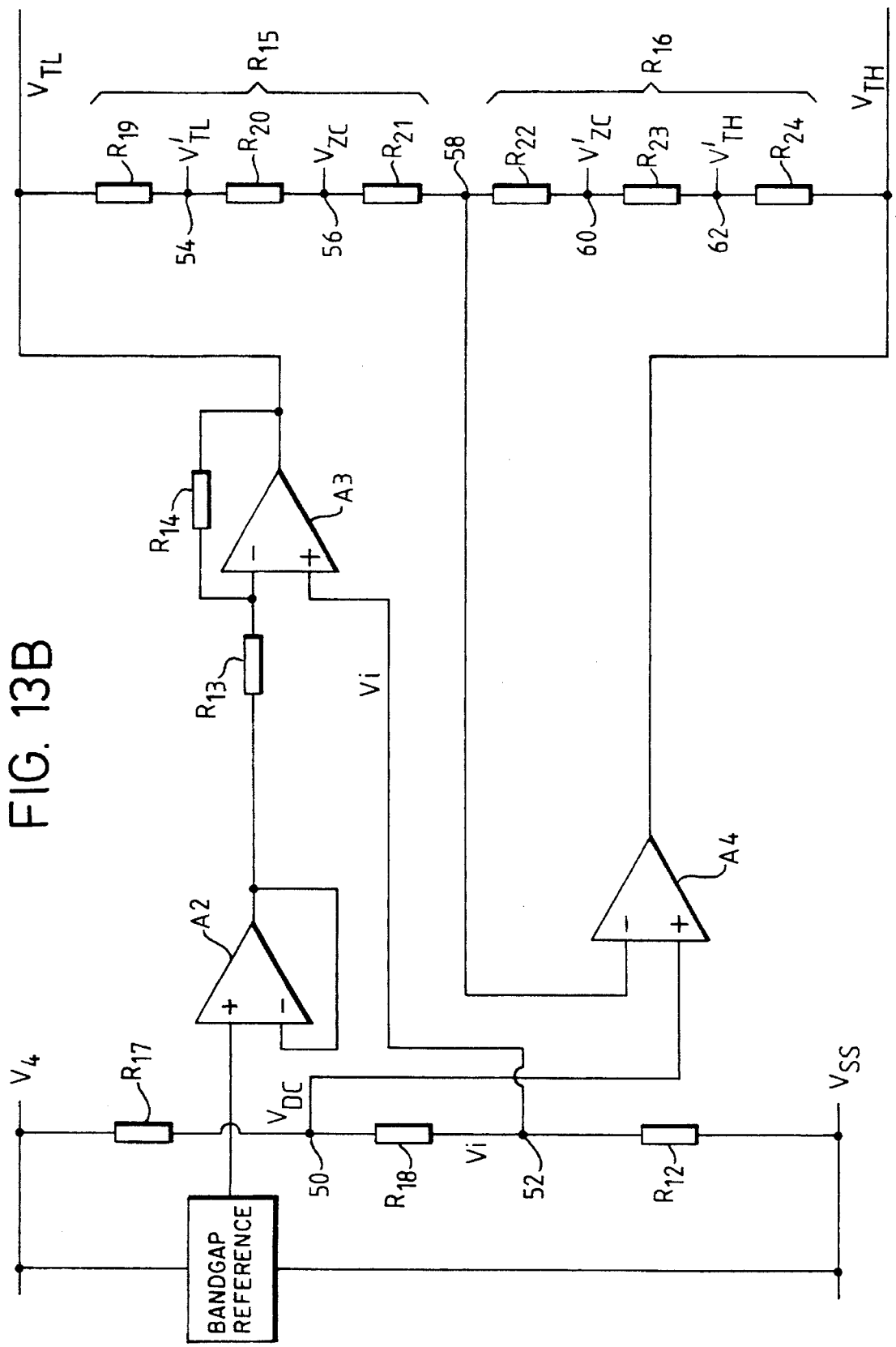
FIG. 13B shows a preferred circuit for the generation of reference voltages, incorporating the circuitry of FIGS. 13 and 13A.

FIG. 13B shows a circuit allowing all required threshold voltages, $V_{TH}$, $V'_{TH}$, $V'_{ZC}$, $V_{ZC}$, $V'_{TL}$, $V_{TL}$, to be obtained from the two peak detection threshold values $V_{TH}$, $V_{TL}$. Circuit elements which are identical to those of FIGS. 13 and 13A have identical reference symbols. A first resistive divider comprising resistors $R_{17}$, node 50, resistor $R_{18}$, node 52 and resistor $R_{12}$ is connected between the supply $V_4$ and ground $V_{SS}$. A second resistive divider network comprising: resistor $R_{19}$; node 54; resistor $R_{20}$; node 56; resistor $R_{21}$; node 58; resistor $R_{22}$; node 60; resistor $R_{23}$; node 62 and resistor $R_{24}$ is connected between the outputs of amplifiers A3, A4 respectively. In the first resistive divider, resistors $R_{17}$, $R_{18}$ jointly perform the function of resistor $R_{10}$ in FIG. 13, and by fixing $R_{18} = R_{14}$, and $R_{17} = R_{13} + R_{14}$, the required value of $V_{DC} = \frac{1}{2}V_C$ is obtained at node 50 for biasing the noninverting input of amplifier A4, while node 52 maintains the correct voltage $V_i$ as discussed above.

In the second resistive divider, by fixing $R_{19} = R_{24}$; $R_{20} = R_{23}$; $R_{21} = R_{22}$, each pair of reference voltages ($V_{TH}$ and $V_{TL}$; $V'_{TL}$ and $V'_{TL}$ at nodes 62, 54; $V'_Z$ and $V_Z$ at nodes 56, 60) are symmetrical about $V_{DC}$, and the voltage at node 58 is equal to the DC component $V_{DC}$, as required for proper biasing of amplifier A4. Resistors $R_{19}$, $R_{20}$, $R_{21}$ together perform the function of $R_{15}$ in FIG. 13A, and resistors $R_{22}$, $R_{23}$, $R_{24}$ perform the function of $R_{16}$ in FIG. 13A.

Each of the reference voltages described is then connected to a respective voltage comparator to allow peak and zero crossing detection to be carried out, as described above.

Figure 14:
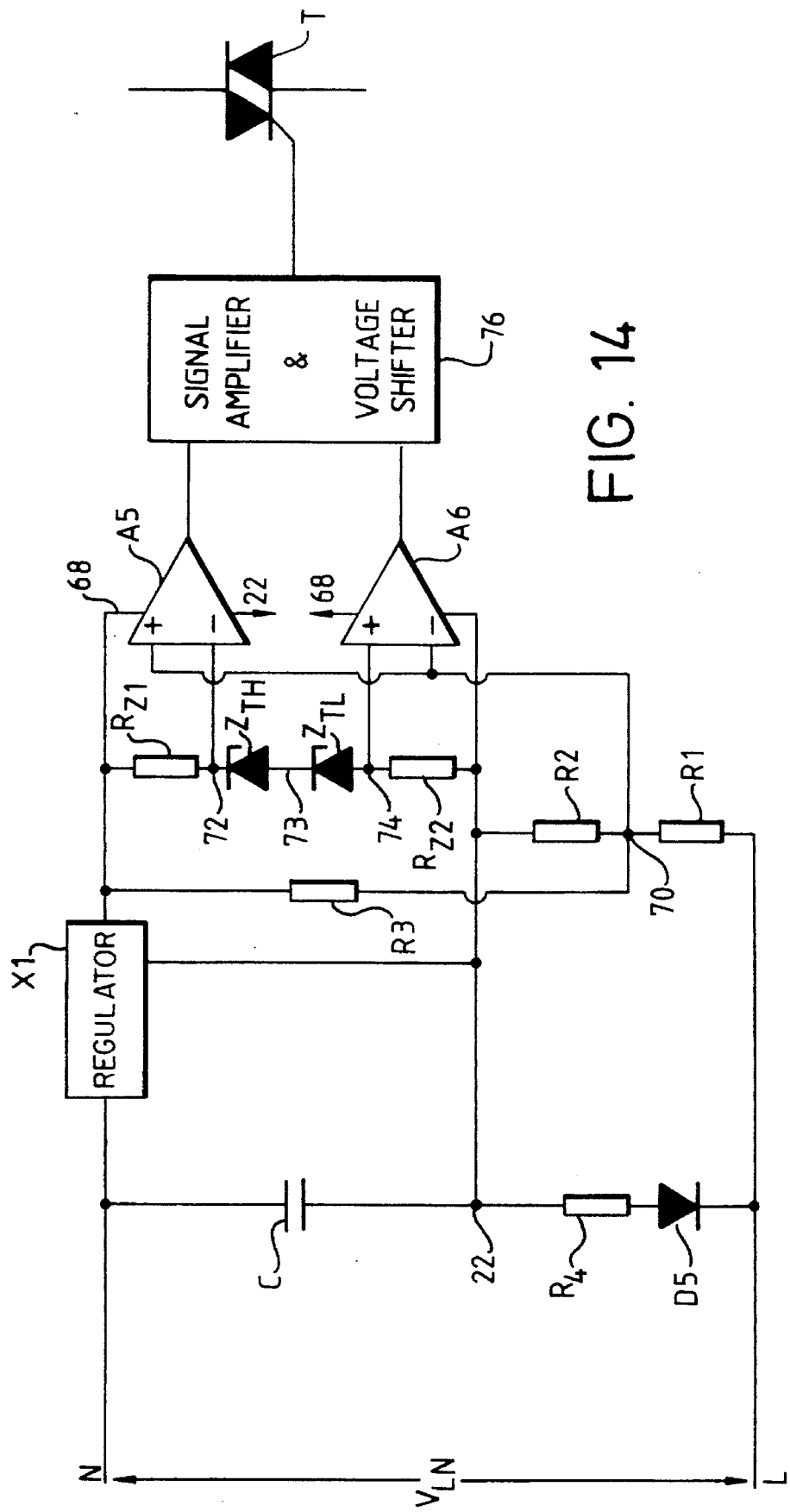
FIG. 14 shows a circuit diagram of an automatic voltage sensitive switch circuit according to a third embodiment of the invention.

FIG. 14 shows a third embodiment of a DC voltage supply circuit according to the invention, using discrete components. Again, features similar to those in FIG. 8 have similar reference numbers.

As in the previously described implementations, a half-wave rectifier comprises diode $D_5$, resistor $R_4$, node 22 and capacitor C, respectively connected in series between the live line L and the neutral line N. A three terminal regulator X1 has: a ground input connected to node 22; a voltage input connected to the neutral line N; and a voltage output connected a node 68. Two resistors $R_1$, $R_2$ are connected in series between between the live line L and node 22 respectively. The two resistors share a common node 70. A further resistor $R_3$ is connected between the node 68 and the node 70. A resistor $R_{Z1}$, a node 72, zener diode $Z_{TH}$, node 73, zener diode $Z_{TL}$, node 74 and resistor $R_{Z2}$ are respectively connected in series between node 68 and node 22. Two comparators A5, A6 have power supply connections connected to nodes 68 and 22. A non-inverting input of A5 is connected to node 70, as is an inverting input of A6. An inverting input of A5 is connected to node 72, and a non-inverting input of A6 is connected to node 74.

A signal amplifier and voltage shifter 76 has two inputs each connected to an output of A5 and A6. The signal amplifier and voltage shifter 76 has an output connected to a gate input of triac T.

The zener diodes $Z_{TL}$, $Z_{TH}$ set the low and high peak detection thresholds $V_{TL}$ and $V_{TH}$, respectively. Resistors $R_{Z1}$, $R_{Z2}$ supply a zener diode bias current, and are chosen such that the node 73 between the zener diodes is at the DC offset voltage $V_{DC}$. Nodes 72 and 74 are then held at voltages greater and less than $V_{DC}$, respectively, by voltages equal to the breakdown voltages of the zener diodes $Z_{TH}$, $Z_{TL}$, respectively. The comparators A5, A6 each produce a high output when the voltage at node 70 exceeds the voltage at node 72, or falls below the voltage of node 74, respectively. The voltage at node 70 is a composite voltage, as discussed for other embodiments of the invention, being a scaled representation of the AC input voltage, supplied by the series connection of $R_1$, $R_2$, added to a DC offset voltage $V_{DC}$ provided by a DC current supplied by $R_3$, through $R_2$. The diode $D_5$, resistor $R_4$ and capacitor C function as described for other embodiments of the invention, to provide a DC voltage across capacitor C. This DC voltage is regulated by X1, to fix $V_{SS}$, node 22, at a fixed voltage, for example 9 V, less than the neutral line N voltage.

The AC input voltage $V_{LN}$ is hence scaled down and voltage shifted, allowing detection of both high and low peaks, gaining the advantages described of full-wave voltage sensing, in an embodiment using discrete components.

The signal amplifier and voltage shifter 76 produces gate pulses to the triac, T when no output pulses are produced by A5, A6,—indicating a low-range AC input voltage, and so enabling voltage doubling rectification mode of an associated doubler/bridge rectifier—and suppresses such gate pulses when output pulses from A5, A6 are present—indicating a high-range AC input voltage, and so ensuring that bridge rectification mode is used.

FIG. 15 shows the voltages $V_I$, $V_I'$ at node 70, for low-range and high-range AC input voltages, respectively. The scaled AC input voltage is shifted by DC offset $V_{DC}$, and compared with the upper and lower thresholds $V_{TH}$, $V_{TL}$. The outputs P3, P4 of comparators A5, A6, respectively, correspond to a high voltage input $V_I'$. R denotes the allowed range of input voltages to the control circuit.

However, the embodiment of the invention using discrete components does not include the filtering and other functions included in integrated circuit implementations. Zener diode breakdown voltages have a tolerance of around ±10%, and so may provide less accurate peak voltage detection than other embodiments described.

The additional data points introduced by providing "dual cycle" detection, i.e. detection during both positive and negative excursions, of the range of the AC input voltage lead to more efficient detection of the voltage range and more efficient filtering, applied to the whole cycle.

By using the method described, even the highest AC peak to peak voltages may be accommodated within the permitted voltage range and hence subjected to the full wave zero crossing detection and voltage sensing described. This results in faster, more reliable detection of AC voltage level and hence many of the drawbacks described with reference to the single cycle (i.e. one excursion only per cycle) detection scheme are overcome.

While the discussion herein has referred to mains input AC voltages with a baseline at the zero volts level, the circuits of the invention may equally be used with input AC voltages with non-zero baseline levels, with suitable adjustment of resistor values and voltage threshold levels.

What is claimed is:

1. A DC voltage supply circuit for rectifying an alternating voltage which has upper and lower excursions with respect to a baseline, and supplying a DC output voltage at a substantially constant value, said voltage supply circuit comprising:

rectification circuitry for rectifying an alternating voltage;

a voltage detection circuit for detecting, within upper and lower limits, peak values of said excursions for controlling said rectification circuitry; and a voltage shift circuit having an input connected to receive the alternating voltage and connected to supply a composite voltage to the voltage detection circuit, the voltage shift circuit scaling said alternating voltage and shifting its baseline by a preselected DC bias, in order that the excursions fall within the upper and lower limits, so that the voltage detection circuit is operable to detect peak values of both upper and lower excursions.

2. A DC voltage supply circuit according to claim 1 which is operable with at least two distinct ranges of values of the alternating voltage, the range containing the applied alternating voltage being indicated by an output of the voltage detection circuit, the rectification circuitry having a number of modes equal to the number of distinct ranges of values of the alternating voltage, and the mode of operation of the rectification circuitry being selected according to the range indicated.

3. A DC voltage supply circuit according to claim 1 or claim 2 wherein the detection circuit includes baseline crossing detection circuitry to detect baseline crossings of the applied alternating voltage, and the rectification circuit includes a switch for selecting the mode of operation, the baseline detection circuitry being used to generate control signals to the switch.

4. A DC voltage supply circuit according to claim 1 wherein the rectification circuitry is a doubler/bridge rectifier, with two modes of operation.

5. A DC voltage supply circuit according to claim 1 wherein the voltage detection circuit has a power supply terminal for receiving a DC supply voltage and wherein said DC bias, and said scaled alternating voltage are both provided by a resistive divider network comprising a plurality of resistive elements connected between said input for receiving the alternating voltage and said power supply terminal, the preselected DC bias being selected by controlling the DC current through one of said resistive elements of the resistive divider.

6. A DC voltage supply circuit according to claim 1 wherein the voltage detection circuit has two power supply terminals for receiving DC supply voltages and wherein the preselected DC bias is derived from the DC supply voltage to the voltage detection circuit by use of a resistive divider connected between the two DC supply voltages; the scaled input alternating voltage being provided by a capacitive divider connected between one of the DC supply voltages and the input for receiving the alternating voltage.

7. A DC voltage supply circuit according to claim 1 wherein the voltage detection circuit includes a plurality of voltage comparators, receiving a respective plurality of reference voltages from a voltage reference circuit, each reference voltage corresponding to a threshold to be detected, the reference voltages each being defined as a fixed voltage with reference to the shifted baseline of the composite voltage.

8. A DC voltage supply circuit according to claim 7, wherein the voltage reference circuit includes a fixed voltage reference supply circuit, and a first amplifier connected so as to receive both an output of the fixed voltage reference supply circuit and a bias, the first amplifier producing an output voltage equal to the preselected DC bias minus a predetermined multiple of the output voltage of the fixed reference voltage supply circuit.

9. A DC voltage supply circuit according to claim 8 wherein the voltage reference circuit further comprises a second amplifier, connected to receive as inputs the output of the first amplifier and the preselected DC bias, and producing an output voltage equal to the preselected DC bias plus a predetermined multiple of the output voltage of the fixed reference voltage supply circuit.

10. A DC voltage supply circuit according to claim 9 wherein the voltage reference circuit further comprises a resistive divider network including a plurality of nodes connected between the output of the first amplifier and the output of the second amplifier, whereby a different required voltage reference is available at each node.

* * * * *

UNITED STATES PATENT AND TRADEMARK OFFICE
CERTIFICATE OF CORRECTION

PATENT NO. : 5,572,415
DATED : November 5, 1996
INVENTOR(S) : Muni Mohan

It is certified that error appears in the above-indentified patent and that said Letters Patent is hereby corrected as shown below:

Col. 3, ln. 11, delete "$V_{LN} = V_2V_4,$", insert --$V_{LN} = V_2-V_4,$--.

Col. 3, ln. 38, delete "$264 \times \sqrt{7} \times 0.0177 = 6.60V.$", insert --$264 \times \sqrt{2} \times 0.0177 = 6.60V.$--.

Col. 4, ln. 58, delete "25".

Col. 9, ln. 2, delete "kn", insert --k$\Omega$--.

Col. 9, ln. 47, delete comma after equation, insert period after equation.

Col. 10, ln. 60, delete "$V_{zc}, V_{zc}.$", insert --$V_{zc}, V'_{zc}.$--.

Col. 11, ln. 66, delete "$V_{TH}, V_{TH}$", insert --$V_{TH}, V'_{TH}$--.

UNITED STATES PATENT AND TRADEMARK OFFICE
CERTIFICATE OF CORRECTION

PATENT NO. : 5,572,415
DATED     : November 5, 1996
INVENTOR(S) : Muni Mohan

It is certified that error appears in the above-indentified patent and that said Letters Patent is hereby corrected as shown below:

Col. 12, ln. 52, delete "Ireif" ", insert --Iref'''--.

Col. 13, ln. 35, delete " $\dfrac{V_0 \cdot V_i}{R14}$ "

insert -- $\dfrac{V_0 - V}{R14}$ --.

Col. 14, ln. 11, delete "and-negative", insert --and negative--

Signed and Sealed this

Fourth Day of March, 1997

Attest:

BRUCE LEHMAN

Attesting Officer    Commissioner of Patents and Trademarks